(12) United States Patent
Gonczi et al.

(10) Patent No.: US 11,308,036 B2
(45) Date of Patent: Apr. 19, 2022

(54) SELECTION OF DIGEST HASH FUNCTION FOR DIFFERENT DATA SETS

(71) Applicant: EMC IP Holding Company LLC, Hopkinton, MA (US)

(72) Inventors: Istvan Gonczi, Berkley, MA (US); Ivan Bassov, Brookline, MA (US); Sorin Faibish, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 16/381,303

(22) Filed: Apr. 11, 2019

(65) Prior Publication Data

US 2020/0327098 A1  Oct. 15, 2020

(51) Int. Cl.
| | |
|---|---|
| G06F 16/00 | (2019.01) |
| G06F 16/174 | (2019.01) |
| G06F 16/13 | (2019.01) |
| G06F 17/18 | (2006.01) |
| H04L 9/06 | (2006.01) |

(52) U.S. Cl.
CPC ........ G06F 16/1752 (2019.01); G06F 16/137 (2019.01); G06F 17/18 (2013.01); H04L 9/0643 (2013.01)

(58) Field of Classification Search
CPC .. G06F 3/0683; G06F 16/1752; G06F 16/137; G06F 3/0641; G06F 17/18; G06F 3/0634; G06F 3/0608; H04L 9/3239; H04L 9/0643
See application file for complete search history.

(56) References Cited

U.S. PATENT DOCUMENTS

| | | | | |
|---|---|---|---|---|
| 5,542,089 A | * | 7/1996 | Lindsay | G06F 16/2462 |
| 7,827,146 B1 | * | 11/2010 | De Landstheer | G06F 11/1458 |
| | | | | 707/651 |
| 9,424,285 B1 | * | 8/2016 | Condict | G06F 3/0608 |
| 2004/0260874 A1 | * | 12/2004 | Mori | G06F 3/0617 |
| | | | | 711/114 |
| 2006/0095521 A1 | * | 5/2006 | Patinkin | H04L 51/12 |
| | | | | 709/206 |
| 2006/0224844 A1 | * | 10/2006 | Kano | G06F 12/0223 |
| | | | | 711/162 |

(Continued)

*Primary Examiner* — Shiow-Jy Fan
(74) *Attorney, Agent, or Firm* — Muirhead and Saturnelli, LLC

(57) ABSTRACT

Techniques for processing data may include: receiving a plurality of data chunks for a data set; performing data deduplication processing for the plurality of data chunks; determining, in accordance with one or more criteria, whether a frequency distribution of a frequency histogram of digest byte frequencies is sufficiently uniform; and responsive to determining that the frequency distribution of the frequency histogram is not sufficiently uniform, performing processing to update data deduplication settings for the data set. Updating the data deduplication settings may include using a stronger hash algorithm and/or a larger size digest when generating subsequent digests. The data deduplication processing may include: determining, using a current hash algorithm, a plurality of digests for the plurality of data chunks of the data set; and updating the frequency histogram of digest byte frequencies for the data set in accordance the plurality of digests.

22 Claims, 12 Drawing Sheets

(56) References Cited

U.S. PATENT DOCUMENTS

| | | | |
|---|---|---|---|
| 2009/0216910 A1* | 8/2009 | Duchesneau | H04L 41/04 709/250 |
| 2011/0246741 A1* | 10/2011 | Raymond | G06F 16/137 711/170 |
| 2013/0226594 A1* | 8/2013 | Fuchs | G10L 19/008 704/500 |
| 2017/0199892 A1* | 7/2017 | Harnik | G06F 16/24556 |
| 2017/0199895 A1* | 7/2017 | Harnik | G06F 16/1752 |
| 2017/0286003 A1* | 10/2017 | Sala | G11C 29/74 |
| 2018/0039423 A1* | 2/2018 | Yoshii | G06F 3/0689 |
| 2018/0167199 A1* | 6/2018 | Kaul | G06F 12/14 |
| 2019/0129970 A1* | 5/2019 | Armangau | G06F 16/13 |

* cited by examiner

SELECTION OF DIGEST HASH FUNCTION FOR DIFFERENT DATA SETS

BACKGROUND

Technical Field

This application generally relates to data storage and, more particularly, to techniques for selection of data deduplication options or settings used for digest computation for a particular data set.

Description of Related Art

Systems may include different resources used by one or more host processors. The resources and the host processors in the system may be interconnected by one or more communication connections, such as network connections. These resources may include data storage devices such as those included in the data storage systems manufactured by Dell Inc. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing data. A plurality of data chunks for a data set is received. Data deduplication processing is performed for the plurality of data chunks. It is determined, in accordance with one or more criteria, whether a frequency distribution of the frequency histogram is sufficiently uniform. Responsive to determining that the frequency distribution of the frequency histogram is not sufficiently uniform, processing is performed to update data deduplication settings for the data set. The data deduplication processing includes: determining, using a current hash algorithm, a plurality of digests for the plurality of data chunks of the data set; and updating a frequency histogram for the data set in accordance the plurality of digests. The data deduplication settings may include the current hash algorithm and a current digest size. The processing to update the data deduplication settings for the data set may include modifying any of the current hash algorithm and the current digest size. Modifying the current hash algorithm may include selecting a new hash algorithm to be used in connection with generating digests for data deduplication processing performed for subsequent data chunks of the data set. The new hash algorithm may be a stronger hash algorithm than the current hash algorithm and the new hash algorithm may be expected to generate a second distribution of frequencies with respect to byte values for bytes of generated digests whereby the second distribution of frequencies may be expected to be more uniform than the frequency distribution of the frequency histogram generated using the current hash algorithm. The current hash algorithm may be a non-cryptographic hash algorithm that is replaced with the new hash algorithm that is a cryptographic hash algorithm. Modifying the current digest size may include selecting a new digest size to be used in connection with generating digests for data deduplication processing performed for subsequent data chunks of the data set. The current digest size may be a specified number of bytes, and the frequency histogram may have a plurality of dimensions including a first dimension denoting the specified number of bytes. The plurality of dimensions of the frequency histogram may further include a second dimension denoting a number of allowable byte values for each byte of a digest having the current digest size. The plurality of dimensions of the frequency histogram may further include a third dimension of counter values or frequencies for each different allowable byte value of each byte for a digest having the current digest size. The one or more criteria may indicate that, for the frequency distribution to be sufficiently uniform, at least one statistical metric for the frequency distribution is less than a specified maximum threshold. The at least one statistical metric may include any of variance and standard deviation. The data set may include any of a logical device, a database, one or more selected portions of a database, data used by a particular application stored on one or more logical devices, selected portions of one or more logical devices, one or more files, one or more directories, one or more file systems, particular portions of one or more directories, and particular portions of one or more file systems. The method may be performed as part of inline processing of the plurality of data chunks in connection with an I/O path or data path when servicing I/Os accessing the plurality of data chunks. The method may be performed offline and not as part of inline processing of the plurality of data chunks in connection with an I/O path or data path when servicing I/Os accessing the plurality of data chunks. The method may include determining, in accordance with the one or more criteria, whether the frequency distribution of the frequency histogram has maintained a specified level of uniformity for a specified time period; and responsive to determining the frequency distribution of the frequency histogram has maintained a specified level of uniformity for a specified time period, performing first processing to update the data deduplication settings for the data set. The first processing may include performing any of: updating the current hash algorithm to a new hash algorithm that is computationally less intensive that the current hash algorithm whereby the new hash algorithm is expected to take less processor time than the current hash algorithm to generate a same digest; and reducing a current digest size of digests generated using the current hash algorithm.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
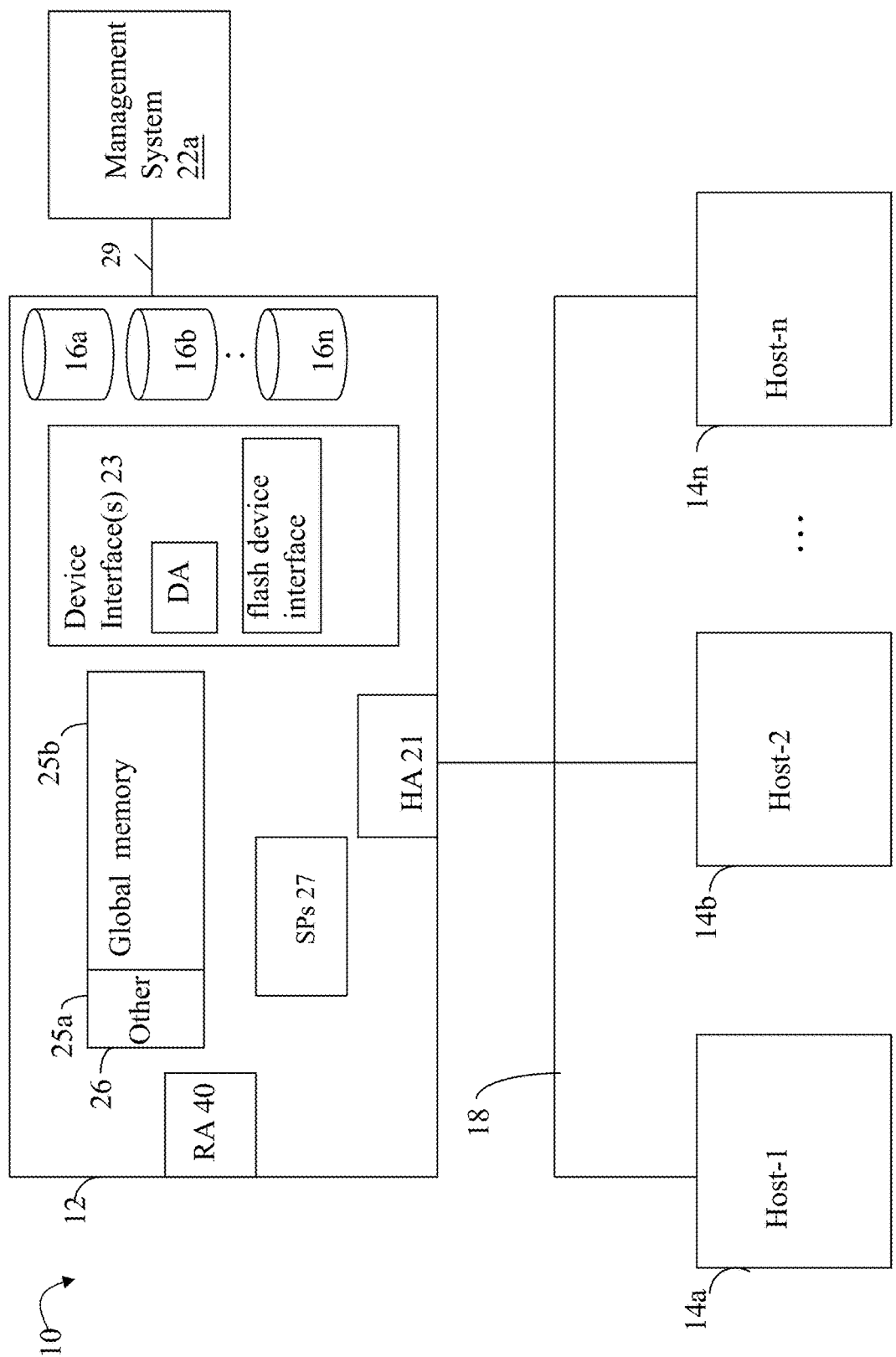
FIGS. 1 and 2B are examples of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate data chunks whereby only a single instance of the data chunk is retained (stored on physical storage) and where pointers or references may be used in connection with duplicate or redundant copies (which reference or identify the single stored instance of the data chunk).

Figure 2A:
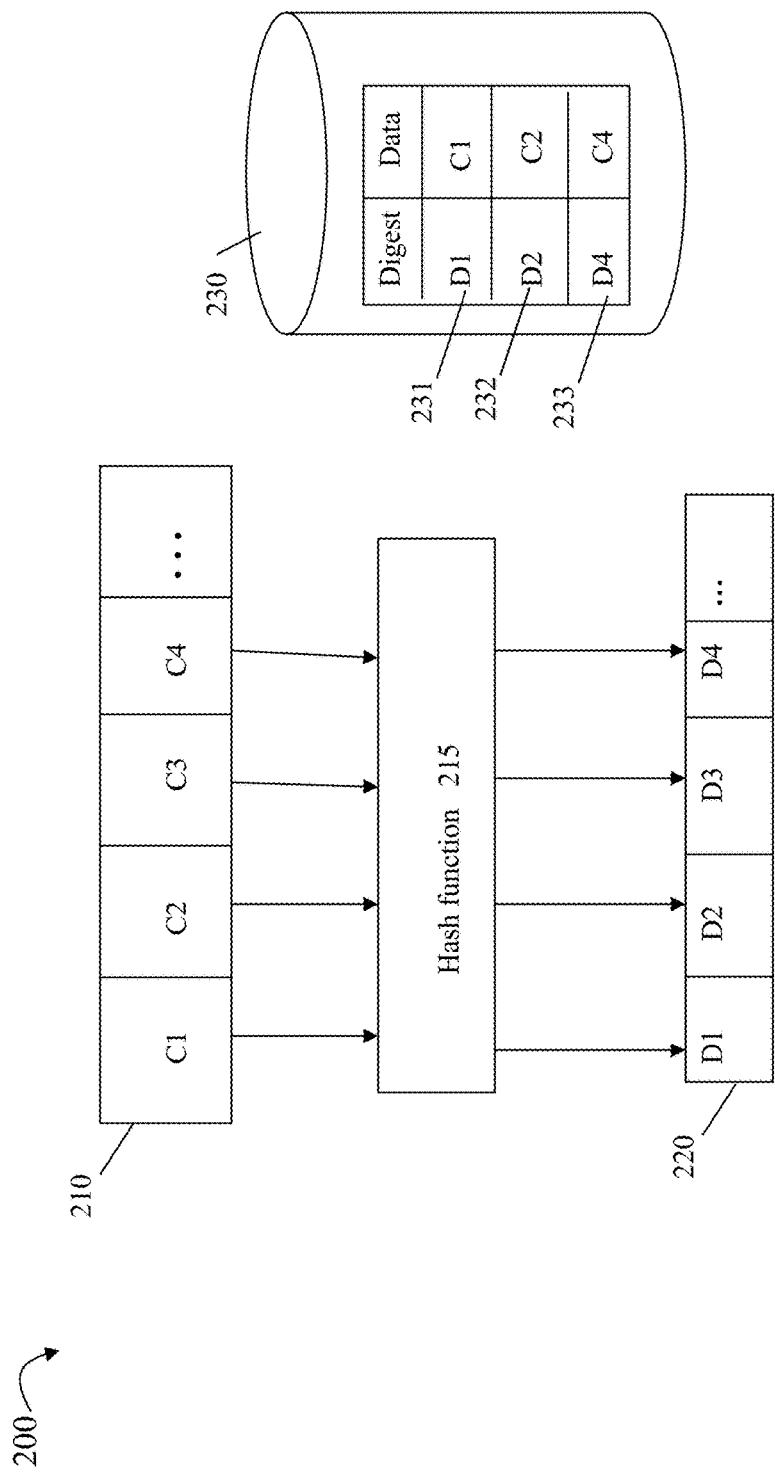
FIG. 2A is an example illustrating data deduplication as may be performed in an embodiment in accordance with the techniques herein.

Referring to the FIG. 2A, shown is an example 200 illustrating processing that may be performed in connection with data deduplication processing in an embodiment in accordance with techniques herein. The element 210 may denote the original data being written or stored on back-end non-volatile storage. The original data may be partitioned into multiple data chunks C1, C2, C3, C4 and the like. In at least one embodiment and for purposes of illustration, the data chunks may all be the same size where the size may vary with embodiment. As a variation depending on the data deduplication technique utilized, the chunks of 210 may be of varying or different sizes. Each chunk is provided as an input to hash function 215. As noted above, in at least one embodiment, the hash function 215 may be the SHA-256 hashing algorithm, or more generally, any suitable cryptographic, or non-cryptographic hashing function known in the art. For each chunk of 210, the hash function 215 may perform processing and generate, as an output, a hash value or digest. The element 220 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different chunks. The strength of the hash function 215 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks). If two chunks, such as C1 and C4, have different digests whereby D1 does not equal D4, then chunks C1 and C4 do not match (e.g., are different or non-matching data chunks). In cases where two matching or identical chunks have the same digest, only a single copy of the data chunk is stored on backend non-volatile physical storage of the data storage system. The single stored instance of the data chunk may be referenced using a pointer, handle, the digest of the chunk, and the like.

The element 230 of the FIG. 2A may denote the data store used to store data chunks. In this example, as noted above, assume chunks C1 and C3 are the same with remaining chunks C2 and C4 being unique. In at least one embodiment, element 230 may be organized and managed using a data structure, such as a hash table. In at least one embodiment, computed digests, or portions thereof, may be used as an index into the hash table where the single unique instances of data chunks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the chunk of data may be mapped by hash function 215, and thus by the chunk's digest, to a particular entry in the table at which the chunk of data is stored. To further illustrate, the hash function 215 may be used to generate a digest for a particular data chunk. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data chunk, such as C1, its digest may be mapped to a particular hash table entry 231 whereby if the table entry is null/empty, or otherwise does not already include a data chunk matching C1, then C1 is stored in the table entry along with its associated digest D1 (this is the first time chunk C1 is recorded in the data store 230). Otherwise, if there is already an existing entry in the table including a data chunk matching C1, it indicates that the new data chunk is a duplicate of an existing chunk. In this example as noted above, processing is performed for C1, C2, and C4 respectively, where entries 231, 232, and 233 are added since there are no existing matching entries in the hash table. When processing chunk C3, as noted above, C3 has a digest D3 matching D1 whereby C3 (and thus D3) maps to entry 231 of the hash table already including a matching chunk C1 (so no additional data chunk is added to 230 for C3 since C3 is determined as a duplicate of C1). In connection with representing a particular file or other storage entity including multiple duplicate occurrences of a particular chunk such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data to its original form, the handle or reference into the hash table for chunk C3 may be used to obtain the actual C3 chunk of data from 230.

Figure 2B:
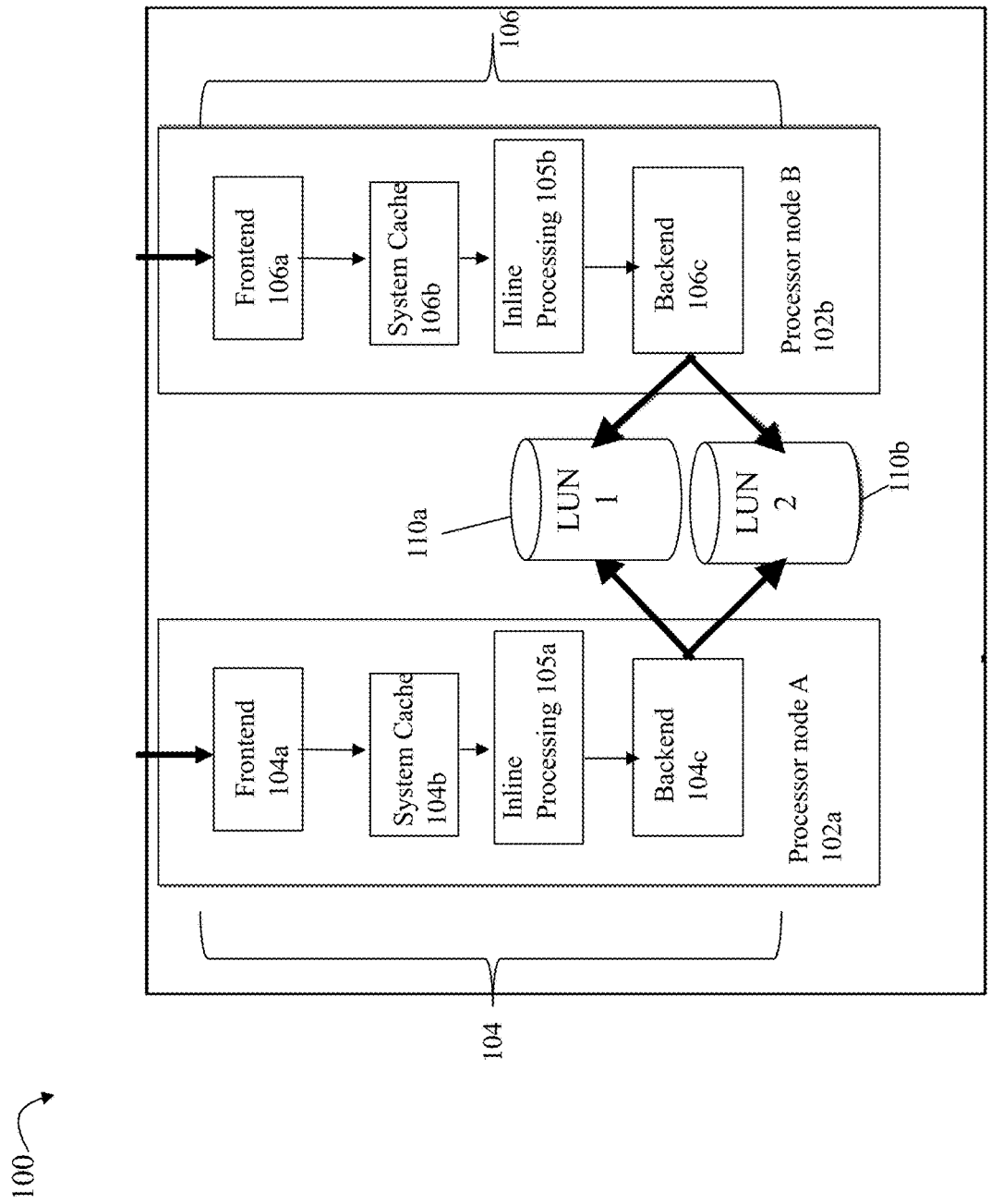

With reference to the FIG. 2B, shown is an example 100 illustrating components that may be included in the data path in at least one existing data storage system in accordance with the techniques herein. The example 100 includes two processor nodes A 102*a* and B 102*b* and associated software stacks 104, 106 of the data path where I/O requests may be received by either processor node 102*a* or 102*b*. In the example 200, the data path 104 of processor node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and permanent non-volatile storage (e.g., back end physical non-volatile storage devices accessed by BE components such as DAs as described herein). During movement of data in and out of the system cache layer 104*b* (e.g., such as in connection with read and writing data respectively, to physical storage 110*a*, 110*b*), inline processing may be performed by layer 105*a*. Such inline processing operations of 105*a* may be optionally performed and may include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102*b* has its own FE component 106*a*, system cache layer 106*b*, inline processing layer 105*b*, and BE component 106*c* that are respectively similar to components 104*a*, 104*b*, 105*a* and 104*c*. The elements 110*a*, 110*b* denote physical storage provisioned for LUNs whereby an I/O may be directed to a location or logical address to read data from, or write data to, the logical address. The LUNs 110*a*, 110*b* are examples of storage objects representing logical storage entities included in an existing data storage system configuration. Since, in this example, writes directed to LUNs 110*a*, 110*b* may be received for processing by either of the nodes 102*a* and 102*b*, the example 100 illustrates what may also be referred to as an active-active configuration.

In connection with a write operation as may be received from a host and processed by processor node A 102*a*, the write data may be written to the system cache 104*b*, marked as write pending (WP) denoting it needs to be written to physical storage 110*a*, 110*b* and, at a later point in time, the write data may be destaged or flushed from the system cache to the physical storage 110*a*, 110*b* by the BE component 104*c*. The write request may be considered complete once the write data has been stored in the system cache whereby an acknowledgement regarding the completion may be returned to the host (e.g., by component 104*a*). At various points in time, the WP data stored in the system cache is flushed or written out to the physical storage 110*a*, 110*b*. In connection with the inline processing layer 105*a*, prior to storing the original data on the physical storage 110*a*, 110*b*, compression and data deduplication processing may be performed that converts the original data (as stored in the system cache prior to inline processing) to a resulting form (that may include compressed and/or deduplicated portions) which is then written to physical storage 110*a*, 110*b*. In at least one embodiment, when deduplication processing determines that a portion (such as a chunk) of the original data is a duplicate of an existing data portion already stored on 110a, 110b, that particular portion of the original data is not stored in a compressed form and may rather be stored in its deduplicated form (e.g., there is no need for compression of a chunk determined to be duplicate of another existing chunk). If the original data portion is not a duplicate of an existing portion already stored on 110a, 110b, the original data portion may be compressed and stored in its compressed form on 110a, 110b.

In connection with a read operation to read a chunk of data, a determination is made as to whether the requested read data chunk is stored in its original form (in system cache 104b or on physical storage 110a, 110b), or whether the requested read data chunk was previously deduplicated or compressed. If the requested read data chunk (which is stored in its original decompressed, non-deduplicated form) is in the system cache, the read data chunk is retrieved from the system cache 104b and returned to the host. Otherwise, if the requested read data chunk is not in the system cache 104b but is stored on the physical storage 110a, 110b in its original form, the requested data chunk is read by the BE component 104c from the backend storage 110a, 110b, stored in the system cache and then returned to the host.

If the requested read data chunk was previously deduplicated, the read data chunk is recreated and stored in the system cache in its original form so that it can be returned to the host. If the requested read data chunk was previously compressed, the chunk is first decompressed prior to sending the read data chunk to the host. If the compressed read data chunk is already stored in the system cache, the data is uncompressed to a temporary or buffer location, the uncompressed data is sent to the host, and the buffer or temporary location is released. If the compressed read data chunk is not in the system cache but stored on the physical storage 110a, 110b, the compressed read data chunk may be read from the physical storage 110a, 110b into the system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage.

When the processor performs processing, such as in connection with the inline processing 105a, 105b as noted above, data may be loaded from the main memory and/or other lower cache levels into its CPU cache. In particular, inline compression (ILC) and inline data deduplication (ILD) may be performed as part of the inline processing 105a, 105b. In at least one embodiment, the size of a data chunk processed by ILC and ILD may be 256 bytes.

Some existing implementations of deduplication use a deduplication data store as described in connection with the element 230 of the FIG. 2A having a hash table organized by indices which are randomly distributed so that updates, retrievals, and other data access operations can be costly. The data store may be stored on backend non-volatile storage PDs which can be costly (in terms of time) to access when performing data deduplication processing. To improve performance, some existing implementations may use caching to cache portions of the data store. However, the entire data store is typically not capable of being stored completely in the cache due to the often large size of the data store as compared to the limited size of the cache. Additionally, any cached portion of the data store may not be persistently stored where the cache thus requires repopulation upon reboot of the system.

Described herein are techniques that may be used in connection with evaluation and selection of a hash function used for generating digests. In at least one embodiment, the techniques described in following paragraphs may be used in connection with evaluating and selecting a hash function used in connection with data deduplication of a particular data set.

Hash algorithms or functions may be generally partitioned into cryptographic and non-cryptographic hash functions. Cryptographic hash functions have certain properties that provide security guarantees that are not provided by non-cryptographic hash functions. Generally, a cryptographic hash function may be characterized as approximating an ideal hash function that has certain properties some of which will now be described. A cryptographic hash function is deterministic in that the same input data always results in the generating the same hash. A cryptographic hash function is a one-way hash function in that it is practically infeasible to determine the input data from the generated hash value except by trying all possible inputs. A cryptographic hash function provides for an avalanche effect whereby a small change to an input should change the generated hash value so extensively that the new hash value appears uncorrelated with any prior old hash value generated for the unchanged original input. A cryptographic hash function is collision resistant in that is infeasible to find two different input data chunks that map to the same generated hash value. In contrast, non-cryptographic hash functions may be characterized as not providing all such properties to the same extent as stronger cryptographic hash functions. Thus, non-cryptographic hash functions may be characterized as providing weaker guarantees of such properties in exchange for performance improvements. Generally, hash algorithms or functions may be characterized as having a level of strength.

In some instances, different hash algorithms may be characterized as having different strengths or weaknesses relative to one another based on such desirable properties or characteristics of a strong ideal hash algorithm. Generally, the relative strength of different hash algorithms may be characterized based on properties some of which are as described herein.

A hash function H maps an input X to an output Y which may be more formally expressed as H(X)=Y, where X is the independent variable and Y is the dependent variable. The set of possible input values for X may also be referred to as the input domain. The set of possible output values for Y may also be referred to as the output range. The ideal hash function such as approximated by a cryptographic hash function is one that has the above-noted properties. Based on such properties as described herein, the ideal hash function such as approximated by a cryptographic hash function its generated outputs are evenly distributed over the entire output range independent of what the input values are. Thus, even if the input values are confined to a particular subset of the input domain, the observed generated outputs are expected to also be evenly distributed and more generally adhere to the above-noted properties. For example, consider a subset of similar input values generated by making successive single bit changes to an original input value. For such a subset of similar input values, an ideal hash function such as a cryptographic hash function is expected to generate output values meeting the above-noted properties and whereby the generated output values appear indistinguishable from a set of randomly generated values (e.g., no correlation between the input values and the generated output values over the entire output range independent of what the input values are). The cryptographic hash functions may be characterized as stronger than the non-cryptographic hash functions by algorithmically providing for adherence to the properties noted above. Thus, the cryptographic hash functions, in contrast to weaker non-cryptographic hash functions, also algorithmically providing for generating outputs that are evenly distributed over the entire output range independent of the input values. For a particular non-cryptographic hash function, when the input values are confined to a first particular subset of the input domain, the generated output values may not be evenly distributed. In contrast, for the same particular non-cryptographic hash function, when the input values are confined to a different second particular subset of the input domain, the generated output values may be evenly distributed.

When estimating the collision resistance of a specific hash function or hash algorithm used for digest computation, a typical analysis that is performed is a statistical collision probability estimate. In one approach, this analysis may be based on M, the number of possible hash or digest key values that can be generated by the hash function (e.g., as based on the length or number of bits in the hash or digest computed), and N, the size of the hash function input space (e.g., the number of inputs expected to be hashed or provided as inputs to the hash function). For example, a digest that is 16 bytes or 128 bits long, has $M=2^{128}$ possible digest values. The number of inputs or data chunks, N, that may be expected to be processed is dependent on the application context. For example, N may be the number of inputs or data chunks of a database, the number of data chunks a cache is designed to store, or the maximum number of data blocks a data storage array is designed to store. The actual collision probability may be calculated based on the rationale commonly known as the "birthday paradox". One commonly used simple formula to approximate the probability P of a hash collision is EQUATION 1: $N^2/(2*M)$, where N and M are as noted above.

It should be noted that the formula of EQUATION 1 is one practical approximation derived from a more complex and accurate formula based on the probability theory. For large data populations, the simplified formula of EQUATION 1 provides an accurate value for P.

In connection with a particular data set for which data deduplication is performed, one problem is selecting a hash function that prevents hash collisions for the particular data set, or alternatively, has a sufficiently low level or probability of hash collisions for the particular data set. Thus selection of a hash function may attempt to balance a desired minimal level of hash collisions with the computation requirements of different hash functions. For example, a cryptographic hash function, such as the SHA-256 hashing algorithm, may sufficiently prevent hash collisions. Put another way, the SHA-256 hashing algorithm may be characterized as having such a low collision probability that, in the storage industry, it is often considered that such hash collisions are practically impossible (when all bytes of the generated hash values are utilized). In this case, a hash match may be taken for granted to indicate an actual hash match without further verification. However, the SHA-256 hashing algorithm is computationally expensive. It may be that for the particular data set, a weaker and computationally less expensive hashing algorithm, such as SHA-1 or even a non-cryptographic hash function such as Murmur3, may provide a sufficiently low hash collision rate (e.g., within a specified threshold, tolerance or limit) and may therefore be used rather than the more computationally expensive SHA-256 hashing algorithm. A non-cryptographic hash function, such as the Murmur3non-cryptographic hash function, is known in the art and is suitable for general hash-based lookup. Unlike cryptographic hash functions, non-cryptographic hash functions such as the MurmurHash function are not specifically designed to be difficult to reverse, making it generally unsuitable for cryptographic purposes but which may be useful and suitable for other purposes such as data deduplication as described herein for use with particular data sets. MurmurHash has several variants which are in the public domain. In particular, one variant, sometimes referred to or known as Murmur3, generates a 128-bit or 16 byte hash.

Described in following paragraphs are techniques that may be used to analyze the content of a set of digest keys generated using a particular hashing algorithm or function for a particular data set. For example, the current hashing algorithm in use for a data set may be characterized as a weak hash function, such as a non-cryptographic hash function. Rather than use the particular hashing algorithm currently in use for the data set, an embodiment may utilize the techniques described herein to determine whether to alternatively use a stronger hash function (e.g., more computationally expensive but with a lower expected probability of a hash collision) when the current hashing algorithm is a relatively weaker hash function (e.g., less computationally expensive and with a higher expected probability of a hash collision in comparison to the stronger hash function). For the particular data set, processing described herein may determine that use of the stronger hash algorithm is needed. Alternatively, processing described herein may determine that the weaker hash function sufficiently prevents hash collisions (e.g., within a specified tolerance, threshold or limit) for the particular data set. In this latter case, data deduplication processing for the particular data set may use the weaker hash function rather than an alternative stronger hash function that may be more computationally expensive. As another example, the techniques herein may be more generally used to determine whether to switch between hash functions for deduplication of a particular data set based on the uniformity of the observed distribution of the hash function output values or digests. Generally, the data set may be any defined set of stored data such as, for example, a database, one or more selected portions or logical address space portions of a database, data used by a particular application stored on one or more LUNs, selected portions of one or more LUNs, one or more files, one or more directories, one or more file systems, particular portions of one or more directories or file systems, and the like.

The techniques in following paragraphs may be used to analyze the content of a set of digest keys generated for the particular data set using a particular hashing algorithm or function and decide whether to use a different hash algorithm or function, such as a stronger hash function to balance computational requirements against the anticipated hash collision rate for sampled data of the data set. In at least one embodiment, processing may be performed to evaluate the potential hash collision probability for a given data set sample, for example, every 10 seconds and switch between different hashing algorithms or functions to achieve optimal deduplication. Generally, if a weaker, less computationally expensive hash function may be used for deduplication rather than a stronger more computationally expensive hash function, then more computational resources may be available for other processing performed by the data storage system, such as for servicing I/O operations from hosts or other clients of the data storage system. As a result, using weaker and less computationally expensive hash functions where possible for deduplication processing for particular data sets, or portions of particular data sets, provides for efficient use of CPU resources whereby such additional CPU resources may be used for servicing I/O operations and overall increasing data storage system performance.

In at least one embodiment, a current hash function may be evaluated using the techniques herein to determine if the current hash function provides a sufficient level of hash collision avoidance for the sampled data set by having a sufficiently uniform distribution of the generated digests, or whether a stronger, more computationally expensive hash function (e.g., relative to the current hash function) should be utilized to provide the desired level of hash collision avoidance and thus the desired level of uniformity with respect to the generated digests. In at least one embodiment, the current hash function may be evaluated using the techniques herein to determine if the current hash function provides a sufficient level of hash collision avoidance for the sampled data set and, if not, select a different hash function to use with the particular data set. The current hash function may be a weaker, less computationally expensive hash function (e.g., relative to the newly selected different hash function). If the current weaker hash function may be utilized for the particular data set and provide a sufficient level of hash collision avoidance with a sufficient level of uniformity in the distribution of observed generated digests, then the current weaker hash function may be utilized for the particular data set (e.g., the weaker hash function provides a sufficient level of hash collision avoidance and a sufficient level of uniformity in the distribution of the generated digests for the sampled data set but while also reducing the computational requirements to those of the weaker hash function). In at least one embodiment, when the data set changes, processing may be performed again to evaluate and select a particular hash function for use with the new data set. Stronger or weaker hash functions can be adaptively used by comparing, in an on-going or continual periodic manner, one or more metrics measuring the level of uniformity of the frequency distribution of generated digests to one or more reference values or thresholds. For example, consider an embodiment having a low threshold of uniformity and a high threshold of uniformity where a hash function is used to generate digests for a data set. If the resulting frequency distribution of the digests has a measured level of uniformity that does not meet at least the minimum level of uniformity denoted by the low threshold of uniformity, a different stronger hash function may be used in efforts to increase the uniformity of the distribution. If the uniformity of the resulting frequency distribution of the digests is consistently more uniform than that as denoted by the high threshold of uniformity for a specified number of time periods or assessment period, a weaker, less computationally intensive hash function may be used. In this manner, as described in more detail below, the techniques herein may be used for dynamic optimal selection of data deduplication settings or options, such as selection of a hash function, that is driven by the data processed.

One commonly used approach for estimating the hash collision probability in connection with data deduplication is noted above as may be expressed using EQUATION 1. In one aspect, the probability P approximated using EQUATION 1 may be characterized as a lower bound or best case expectation in connection with a hash function. For example, generally the probability P estimated using EQUATION 1 for a hash algorithm or function is obtained in an ideal case using an ideal hash function (as approximated by a cryptographic hash function) based on the assumption that the hash algorithm or function evenly distributes the effect of any single bit change in the input data chunk to all the bits of the calculated digest value. Put another way, the hash function or algorithm generates calculated digest values that appear indistinguishable from a set of randomly generated values given any set of unique inputs. In this manner, regardless of the similarity of individual inputs provided to the hash function, the hash function generates what appears to be a set of random values that are independent of the inputs. Thus, using such a hash function that achieves the expected probability P as in EQUATION 1, it is practically impossible to determine the input data values based on the computed digest values. Generally, only computationally expensive cryptographic hash functions, such as SHA-256, are currently capable of approximating the ideal probability P based on EQUATION 1 whereby there may be no observed correlation between the input data and generated hash digests. Such cryptographic hash functions are computationally expensive and, consistent with the properties described elsewhere herein, may be characterized in one aspect as distributing input data chunk changes evenly between all bit positions of the calculated digest output by the hash function.

As noted above, rather than use a computationally expensive cryptographic hash algorithm or function, such as SHA-256, for deduplication it may be desirable when possible to use a non-cryptographic hash algorithm or function with reduced computation requirements and also reduced collision resistance (e.g., higher probability of hash collision in comparison to cryptographic hash functions). Weaker, non-cryptographic hash functions are expected to have algorithmic imperfections, whereby such imperfections may result in violation of one or more of the properties noted above. For example, one such imperfection may be viewed as invariant bit strings of various lengths appearing in the computed digest outputs. For example, assume a set of similar inputs (e.g., 8 byte inputs that are the same except for bit variations in the same byte position) are provided to a non-cryptographic hash function. The generated digests for such similar inputs may have the same invariant bit string included in the same bit positions of the generated digests. In this manner, the foregoing invariant bit strings in the generated digests of the non-cryptographic hash function for similar input data chunks reveals an imperfection, flaw or algorithmic deficiency that may affect the desired even or uniform distribution of hash function digests for particular data sets. Whether the imperfection, flaw or algorithmic deficiency causes an uneven or non-uniform distribution of hash function digests may vary with the particular inputs, and thus with the particular data set. In other words, a non-cryptographic hash function may generate such similar digests with invariant strings for one particular data set having many similar input data chunks but may not for another different data set that does not have many similar input data chunks. Thus, the same hash function may generate a first frequency distribution of digests for a first data set that is considered sufficiently uniform in accordance with the specified criteria, and may generate a second frequency distribution of digests for a second different data set that is not considered sufficiently uniform in accordance with the specified criteria.

Figure 3:
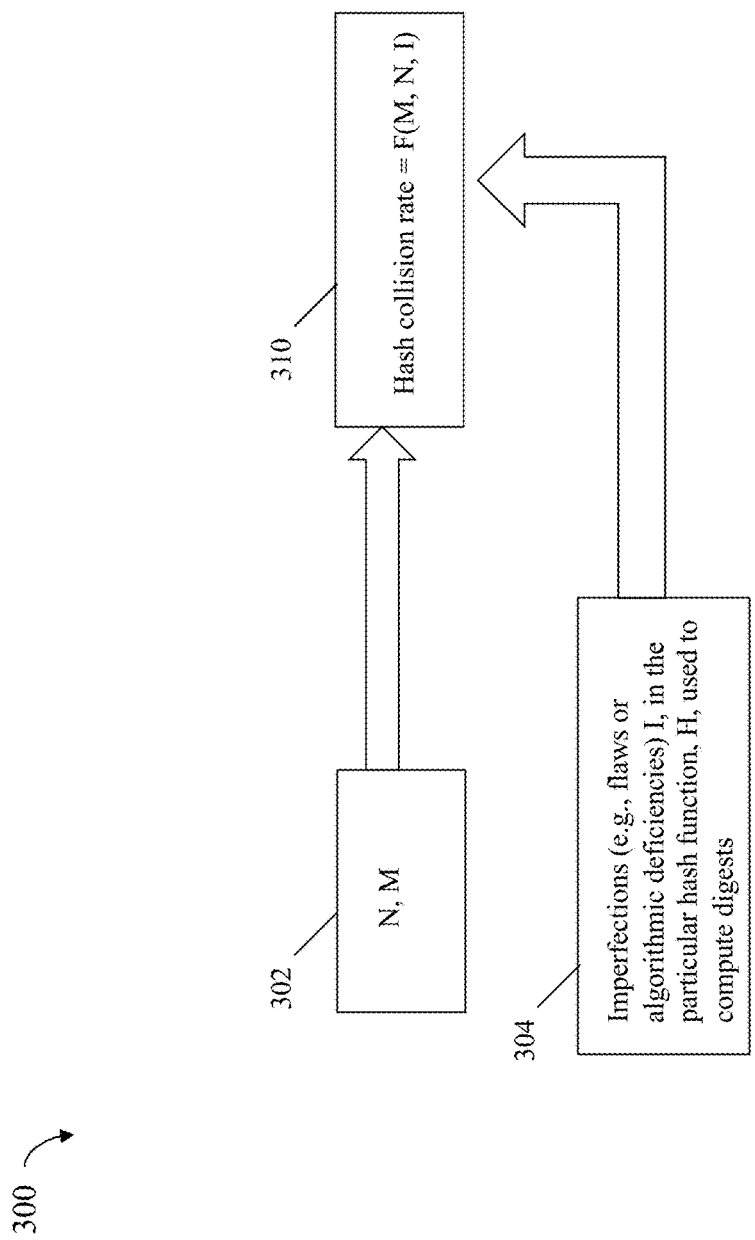
FIG. 3 is an example illustrating factors that affect the hash collision rate in an embodiment in accordance with the techniques herein.

Referring to the FIG. 3, shown is an example 300 graphically illustrating factors that may affect the hash collision rate for a hash function or algorithm used in data deduplication in an embodiment in accordance with the techniques herein. The example 300 illustrates that the hash collision rate 310 for a particular hash algorithm H depends on, or is a function of, M and N 302, as described above in connection with EQUATION 1. Furthermore, the hash collision rate 310 for the particular hash algorithm 310 may also depend on, or be a function of, the imperfections, flaws or algorithmic deficiencies I 304 of the particular hash function or algorithm H used to compute the digests, such as used in connection with data deduplication.

The techniques herein described in the following paragraphs may be used to expose the invariant bit strings of the digests generated using a particular hash algorithm or function thereby allowing for analysis of the algorithmic strength of the particular hash algorithm or function that may be used for a particular data set. The algorithmic strength of the particular candidate hash algorithm or function may be assessed using the techniques herein based on how evenly the generated digests are distributed for a particular data set. In at least one embodiment, the techniques herein may use a frequency histogram for the different byte values of the computed digests to evaluate the particular candidate hash algorithm or function and whether the candidate hash algorithm or function generates digests having a sufficiently uniform distribution for the particular data set.

It should be noted that generally the digests used with the techniques herein may be generated directly by the hash algorithm or function and may include all such bits/bytes of the generated hash values. Alternatively, the digests used with the techniques herein may include a portion of the bits/bytes of the hash values generated by the particular hash algorithm or function being evaluated. For example, the SHA-256 hash function or algorithm generates a 32 byte hash value. An embodiment in accordance with the techniques herein use all 32 bytes as the digest, or may alternatively use a portion (e.g., 16 bytes or 24 bytes) of the generated 32 byte hash value as the digest for use with techniques herein.

In at least one embodiment, individual byte values of the computed digests for a particular hash algorithm or function for a particular data set may be observed and used to compute frequencies included in a 3-dimensional byte value histogram. Frequencies for the different byte values of each of the byte positions in the digests may be calculated for the computed digests. For purposes of illustration, assume that digests are 16 bytes in length. The 3-dimensional byte value histogram may be implemented as a matrix that is a digest byte frequency matrix.

Figure 4:
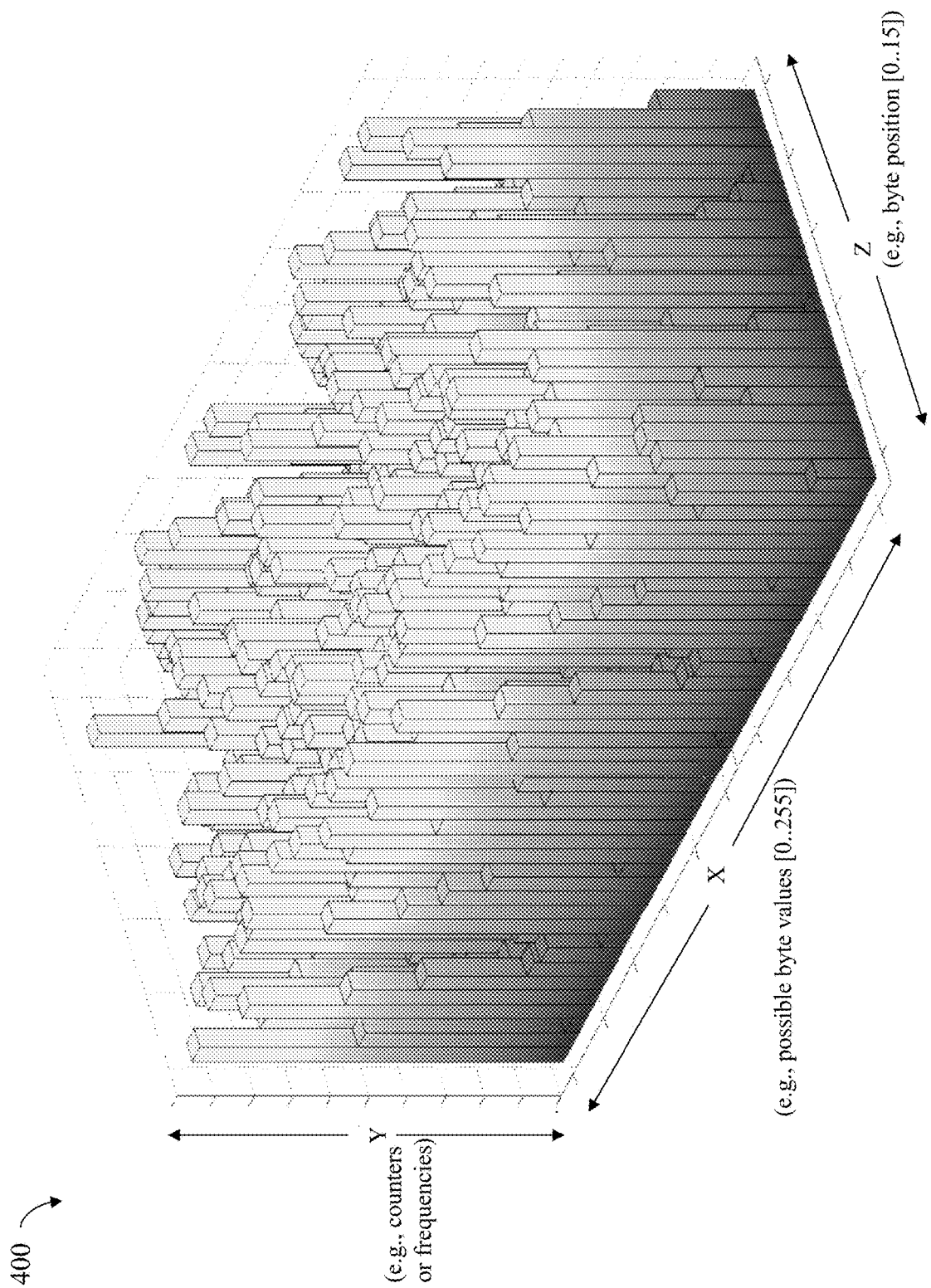
FIG. 4 is an example illustrating a digest byte frequency matrix used to implement the frequency histogram in an embodiment in accordance with the techniques herein.

Referring to the FIG. 4, shown is an example illustrating a frequency histogram that may be used in an embodiment in accordance with techniques herein. The example 400 illustrates a 3-dimensional byte value histogram including an X axis or first dimension, a Y axis or second dimension, and a Z axis or third dimension. In at least one embodiment with 16 byte length digests, the Z axis may correspond to the 16 byte positions thereby indicating that the digest byte frequency matrix has 16 columns (e.g., indices 0 through 15), one for each of the 16 byte positions in each digest. The X axis may correspond to the different allowable or possible byte values for any byte of a digest. For example, any byte may be an integer in the inclusive range 0 through 255, whereby the X axis has a dimension of 256. The Y axis may correspond to the counter or frequency of a particular byte position Z and byte value X. The size of each cell or entry of the digest byte frequency matrix used to implement the frequency histogram should be sufficiently large to store counter values for the particular number or quantity of data chunks having digests to be examined. For example, in at least one embodiment, each cell or entry of the digest byte frequency matrix may be a 64 bit unsigned word capable of storing frequencies or counter values up to $2^{64}$.

For each digest value computed using a particular hash function being evaluated for a particular data set, each byte value of the digest is examined and the appropriate counter of the digest byte frequency matrix is incremented. For example, assume byte 3 of a digest is 73. Processing is performed to select the cell for X=73, Z=3, and increment the cumulative counter or frequency denoted as the Y value. To further illustrate, assume a 16 byte digest has a value of 260 whereby byte 0 has a value of 4, and byte 1 has a value of 2 (e.g., $2^8$=256). For simplicity of illustration, assume the remaining of the 16 bytes are all zero values. In this case, the cumulative counter or frequency Y for X=4, Z=0 is incremented; the cumulative counter or frequency Y for X=2 and Z=1 is incremented; and the cumulative counter or frequencies, Y, for X=0 for the remaining byte positions 2-15 having respective Z values 2-15, are incremented. The foregoing may be performed for each of the 16 byte digests examined for the data set.

Ideally, for the particular hash algorithm or function for the particular data set, it may be expected that the counter values Y of the digest byte frequency matrix, and thus frequencies of the histogram, are approximately evenly or uniformly distributed (e.g., frequencies are approximately the same for all cells of the histogram. With reference to the FIG. 4, it may be ideally expected that the height of each of the columns Y is the same or approximately the same.

Once the digests generated by a particular hash function for a particular data set have been examined and appropriate counters of the frequency histogram 400 updated, the distribution of the frequencies or counter values Y may be evaluated, such as using common variance or statistical analysis techniques, through visual observation, or any other suitable technique that may be used to determine whether the counter values or frequencies of the histogram are similar (e.g., approximate an even or uniform distribution of counter values within specified tolerances, limits or thresholds). Generally, an embodiment may use any one of more of the criteria described herein, or generally suitable, to determine whether a particular distribution of counter values or frequencies for a particular hash algorithm for a particular data set approximates an even or uniform distribution.

Examples of such criteria used in determining whether counter values or frequencies of the distribution are sufficiently similar and thereby approximate an even or uniform distribution within specified tolerances, thresholds or limits may include determining whether all counter values are within a specified range, or determining whether the counter values do not vary from one another by more than a number of standard deviations with respect to the mean/average of such values are described herein. For example, in at least one embodiment, the criteria may specify that the counter values or frequencies of the distribution approximate an even or uniform distribution within specified tolerances, thresholds or limits and therefore should not vary by more than a specified number of standard deviation(s) from the mean of such values. To illustrate, the mean of all counter values or frequencies Y of the histogram may be determined and then the standard deviation with respect to such a mean may be determined. A threshold amount of difference may be specified in terms of the standard deviation or variance. For example, the criteria may specify that all counter values or frequencies be within +/−0.5 standard deviation of the mean, +/−1 standard deviation of the mean, +/−2 standard deviations of the mean, and the like. As another example, the criteria may specify that at least a specified amount (e.g., a percentage) of the counter values or frequencies be within +/−0.5 standard deviations of the mean, +/−1 standard deviation of the mean, +/−2 standard deviations of the mean, and the like. The criteria may also specify that the standard deviation be less than a specified threshold level. The criteria may also specify that the variance be less than a specified threshold level.

Standard deviation and variance as described and used are generally known in the art. For example standard deviation, σ, with respect to the counter values or frequencies may be determined as represented in EQUATION 2 below:

$$\sigma(x) = \sqrt{\frac{\sum_{i=1}^{N}(x-\bar{x})^2}{N-1}} \quad \text{EQUATION 2}$$

where "N" denotes the number of frequencies or counter values, x represents each of the $i^{th}$ frequency or counter values, $\bar{x}$ is the arithmetic mean counter or frequency value, and Σ is the summation function summing the difference between each $i^{th}$ counter value or frequency, x, and the mean $\bar{x}$ for each of the N counter values or frequencies in the distribution. In statistics, standard deviation such as represented in EQUATION 2 may be characterized as a metric denoting an amount of variation or dispersion exists from the average (e.g., mean or expected value) counter value or frequency. A low standard deviation indicates that all N counter values or frequencies of the distribution tend to be very close to the overall mean counter value or frequency $\bar{x}$ (e.g., not much dispersion or variation from the mean counter value or frequency $\bar{x}$). In contrast, the higher the standard deviation, the more spread out or dispersion there is of the different N counter values or frequencies over a large range of values.

The variance is the standard deviation squared. Thus the variance may be represented as in EQUATION 3:

$$\text{Variance} = \text{Standard deviation}^2 \quad \text{EQUATION 3}$$

In at least one embodiment, the criteria may specify that, for the particular hash algorithm or function for the particular data set, if the variance of the counter values or frequencies exceeds a threshold variance level, then an alternative (e.g., stronger) hash algorithm or function should be used to attempt to obtain a distribution of counter values or frequencies meeting the specified criteria. For example, the calculated variance for a distribution of counter values or frequencies used with a non-cryptographic hash function with a data set may exceed a threshold variance level. In response, an alternative hash function, such as a stronger cryptographic hash algorithm or function may be used with the data set. The stronger cryptographic hash algorithm or function is expected to generate a more uniform even distribution of the counter values or frequencies than the distribution of counter values or frequencies generated using the non-cryptographic hash function.

In at least one embodiment, the criteria may specify that, for the particular hash algorithm or function for the particular data set, if the s of the counter values or frequencies exceeds a threshold variance level, then an alternative (e.g., stronger) hash algorithm or function should be used to attempt to obtain a distribution of counter values or frequencies meeting the specified criteria. For example, the calculated variance for a distribution of counter values or frequencies used with a non-cryptographic hash function with a data set may exceed a threshold variance level. In response, an alternative hash function, such as a stronger cryptographic hash algorithm or function may be used with the data set. The stronger cryptographic hash algorithm or function is expected to generate a more uniform even distribution of the counter values or frequencies than the distribution of counter values or frequencies generated using the non-cryptographic hash function.

With reference to the FIG. 4, visual analysis of the digest byte frequency matrix may include examining the height of the columns Y denoting the frequencies or counter values to determine whether the heights of the different columns Y are approximately the same. Put another way, the height of the columns Y denoting the frequencies or counter values may be visually examined to detect anomalies in the counter value distributes as prominently protruding peaks and/or prominently low columns.

In at least one embodiment, a frequency histogram such as illustrated in the FIG. 4 may be maintained and updated for each desired data set. The histogram for a particular data set may be updated as deduplication is performed with respect to data of the particular data set. In at least one embodiment using the techniques herein for selection and evaluation of hash functions used for ILD, an I/O stream of writes may be processed where the I/O stream includes writes to multiple different data sets. To further illustrate use of the techniques herein in at least one embodiment, reference is now made to the FIG. 5.

Figure 5:
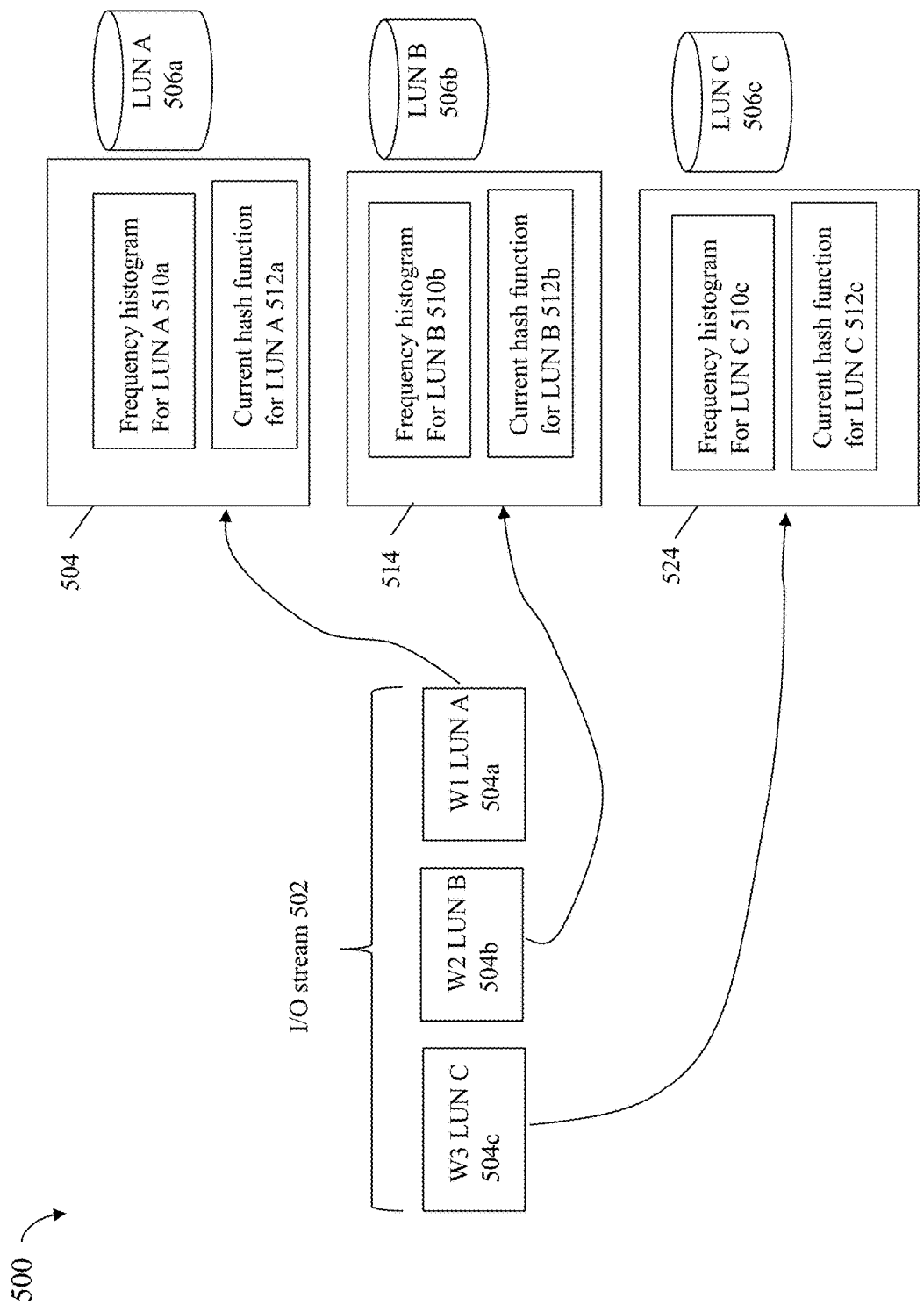
FIGS. 5 and 6 are examples of embodiments illustrating use of the techniques herein.

Referring to the FIG. 5, shown is an example illustrating an embodiment using the techniques herein. The example 500 includes 3 different data sets, where each of the 3 data sets corresponds to a different one of the LUNs: LUN A 506a, LUN B 506b and LUN C 506c. The example 500 also includes I/O stream 502, and 3 sets of state information, 504, 514 and 524, respectively, for LUN A 506a, LUN B 506b, and LUN C 506c.

A different instance of the frequency histogram may be maintained and updated for each of the 3 LUNs, LUN A, LUN B and LUN C. Additionally, the selection and evaluation of different hash functions used for ILD processing for each of the LUNs may be performed independently with respect to the other LUNs. For example, 3 variables (e.g., 3 instances of the variable current hash function) may be maintained for each of the 3 LUNs since the particular hash function that results in a sufficiently uniform distribution of generated digests for writes directed to one of the 3 LUNs may not provide a sufficiently uniform distribution of generated digests for other writes directed to a different one of the 3 LUNs. Consistent with the foregoing, the state information 504 for LUN A 506a may include 510a, the frequency histogram for LUN A, and 512a, identifying the current hash function used for LUN A. The state information 514 for LUN B 506b may include 510b, the frequency histogram for LUN B, and 512b, identifying the current hash function used for LUN B. The state information 524 for LUN A 506a may include 510a, the frequency histogram for LUN A, and 512a, identifying the current hash function used for LUN A. Each of the histograms 510a-510c may be a different instance of the frequency histogram such as described and illustrated in connection with the FIG. 4. The elements 512a-c may be variables identifying the current hash functions or algorithms in use with respect to generating digest values for data chunks written to the different LUNs 506a-c. Initially, assume in this example 500 that each of the variables 512a-c identify the same non-cryptographic hash function or algorithm used to generate digests in connection with ILD processing. Assume that the digests generated by the non-cryptographic hash function identified by each of 512a-c are each 16 bytes as described in connection with the FIG. 4.

The I/O stream 502 may include writes 504a-c from multiple applications on multiple hosts where the I/O stream of writes is received at the data storage system. As each write is serviced on the data storage system, ILD processing may be performed for the write. ILD processing of the write may include determining to which of the LUNs, LUN A, LUN B or LUN C, the write is directed. For example, consider write W1 504a that is a write to LUN A. ILD processing for W1 504a in an embodiment in accordance with the techniques herein may include determining the target LUN to which the write W1 504a is directed as LUN A. ILD processing may utilize the current hash function denoted by 512a to generate a first digest for W1 504a. The frequency histogram for LUN A 510a may be accordingly updated based on the byte values of the 16 bytes of the first digest for W1 504a.

Now consider write W2 504b that is a write to LUN B. ILD processing for W2 504b in an embodiment in accordance with the techniques herein may include determining the target LUN to which the write W2 504b is directed as LUN B. ILD processing may utilize the current hash function denoted by 512b to generate a second digest for W2 504b. The frequency histogram for LUN B 510b may be accordingly updated based on the byte values of the 16 bytes of the second digest for W2 504b.

Now further consider write W3 504c that is a write to LUN C. ILD processing for W3 504c in an embodiment in accordance with the techniques herein may include determining the target LUN to which the write W3 504c is directed as LUN C. ILD processing may utilize the current hash function denoted by 512c to generate a third digest for W2 504c. The frequency histogram for LUN C 510c may be accordingly updated based on the byte values of the 16 bytes of the third digest for W3 504c.

Over time, additional writes are received and processed by the data storage system for the LUNs 506a-c and ILD processing may be performed in a manner similar to that as described above for the writes 504a-c. After a first period of time at a first point in time, the frequency histograms 510a-510c may be evaluated to determine whether to use a different hash function. For example, the frequency histogram 510a may be evaluated to determine whether the distribution of counter values or frequencies of 510a is sufficiently uniform. As described above, a determination of whether the distribution of counter values or frequencies of 510a is sufficiently uniform may be performed in accordance with one or more specified criteria. If processing determines that the distribution of counter values or frequencies of 510a is sufficiently uniform, then the current hash function 512a for LUN A may continue to be used. In this example, 512a may identify a non-cryptographic hash function that generates digests for writes directed to LUN A 506a where such digests have a sufficiently uniform frequency distribution as stored in the frequency histogram 510a. As a result, the non-cryptographic hash function identified by 512a may continue to be used for digest generation in connection with ILD processing for data written to LUN A 506a.

After the first period of time at the first point in time, the frequency histogram 510b may be evaluated to determine whether the distribution of counter values or frequencies of 510b is sufficiently uniform. As described above, a determination of whether the distribution of counter values or frequencies of 510b is sufficiently uniform may be performed in accordance with one or more specified criteria. If processing determines that the distribution of counter values or frequencies of 510b is sufficiently uniform, then the current hash function 512b for LUN B may continue to be used. In this example, 512b may identify the non-cryptographic hash function that generates digests for writes directed to LUN B 506b where the frequency distribution for such digests as stored in the frequency histogram 510b is determined to not be sufficiently uniform (e.g., not meet the specified criteria of uniformity). As a result, an alternative new hash function may be used rather than the non-cryptographic hash function currently identified by 512b. For example, the new hash function may be a cryptographic hash function that will be used in connection with subsequent digest generation for ILD processing for data written to LUN B 506b. Since the new hash function is the cryptographic hash function that is an algorithmically stronger hash function than the non-cryptographic hash function, the frequency distribution of counter values or frequencies of 510b are expected to be more uniform in comparison to the prior frequency distribution obtained when using the prior non-cryptographic hash function.

After the first period of time at the first point in time, the frequency histogram 510c may be evaluated to determine whether the distribution of counter values or frequencies of 510c is sufficiently uniform. As described above, a determination of whether the distribution of counter values or frequencies of 510c is sufficiently uniform may be performed in accordance with one or more specified criteria. If processing determines that the distribution of counter values or frequencies of 510c is sufficiently uniform, then the current hash function 512c for LUN C may continue to be used. In this example, 512c may identify the non-cryptographic hash function that generates digests for writes directed to LUN C 506c where the frequency distribution for such digests as stored in the frequency histogram 510c is determined to not be sufficiently uniform. As a result, an alternative new hash function may be used rather than the non-cryptographic hash function currently identified by 512c. For example, the new hash function may be a cryptographic hash function that will be used in connection with subsequent digest generation for ILD processing for data written to LUN C 506c. Since the new hash function is the cryptographic hash function that is an algorithmically stronger hash function than the non-cryptographic hash function, the frequency distribution of counter values or frequencies of 510c is expected to be more uniform in comparison to the prior frequency distribution obtained when using the prior non-cryptographic hash function.

Subsequent to the first point in time, additional writes may be received and processed by the data storage system. Continuing with the example 500 of the FIG. 5, in at least one embodiment, further updating of the frequency histograms 510b for LUN B and 510c for LUN C, and further evaluation of whether to use an alternative hash function for ILD processing in connection with writes to LUN B 506b and LUN C 506c is no longer needed since a strongest available hash function, a cryptographic hash function, is already currently used for ILD processing in connection with writes to LUN B 506b and LUN C 506c. However, since ILD processing for writes to LUN A 506a currently uses a non-cryptographic hash function, ILD processing for writes to LUN A 506a may continue as described above in connection with the write W1 504a. In particular, further updating of the frequency histogram 510a for LUN A in connection with writes to LUN A 506a and further evaluation of whether to use an alternative hash function for ILD processing in connection with writes to LUN A 506a may continue since the current hash function 512a for LUN A is the non-cryptographic hash function.

After a second time period at a second point in time subsequent to the first point in time, the frequency histogram 510a for LUN A may again be evaluated to determine whether the distribution of counter values or frequencies of 510a is sufficiently uniform. As described above, a determination of whether the distribution of counter values or frequencies of 510a is sufficiently uniform may be performed in accordance with one or more specified criteria. If processing determines that the distribution of counter values or frequencies of 510a is sufficiently uniform, then the current hash function 512a for LUN A may continue to be used. In this example at the second point in time, 512a may identify a non-cryptographic hash function that generates digests for writes directed to LUN A 506a where such digests have a sufficiently uniform frequency distribution as stored in the frequency histogram 510a. As a result, the non-cryptographic hash function identified by 512a may continue to be used for digest generation in connection with ILD processing for data written to LUN A 506a. In at least one embodiment, the foregoing (e.g., with respect to processing of writes directed to LUN A and with request to updating and evaluating the frequency histogram 510a for LUN A) may continue to be performed until processing determines that the frequency histogram 510a for LUN A is no longer sufficiently uniform whereby it is necessary to use the stronger cryptographic hash function in connection with ILD processing for LUN A data/writes.

As just described above, the uniformity of a frequency distribution of counter values or frequencies based on generated digests for a particular data set using a particular hash function may be improved by switching to a different hash function. In at least one embodiment, the different hash function may be a relatively stronger hash function with respect to a weaker hash function currently in use for generating digests for the particular data set with ILD processing. In connection with the foregoing, the same size digests may be used even though different hash functions or algorithms may be used.

An embodiment in accordance with the techniques herein may also improve or increase the uniformity of the frequency distribution of counter values or frequencies by increasing the size of the digest used. For example, the frequency distribution of the counter values or frequencies for digests generated using a first hash function may not be sufficiently uniform. In this example, the first hash function may generate hash values having a number of bytes, B1, and where current digests are formed using less than all the bytes B1 of hash values. For example, the first hash function may be a cryptographic hash function such as SHA-256 which generates 32 byte hash values. At the current point in time when the frequency distribution is determined to not be sufficiently uniform, the digests may be formed using only 24 bytes of the 32 byte generated hash values. As such, responsive to determining that the frequency distribution is not sufficiently uniform, processing in accordance with the techniques herein may increase the digest size from 24 bytes, for example, to 32 bytes and may continue to use the same SHA-256 cryptographic hash function.

In such an embodiment in accordance with the techniques herein, in response to determining that a frequency distribution is not sufficiently uniform, the uniformity of the frequency distribution may be increased by either switching to a different hash function (e.g., that is stronger algorithmically than a current hash function) or using the same hash function but increasing the size of the digest key (e.g., in the case where processing is currently using a truncated portion of the generated hash value as the digest key). An embodiment may also include an option that results in modifying both the hash function and also increasing the size of the digest key used.

Figure 6:
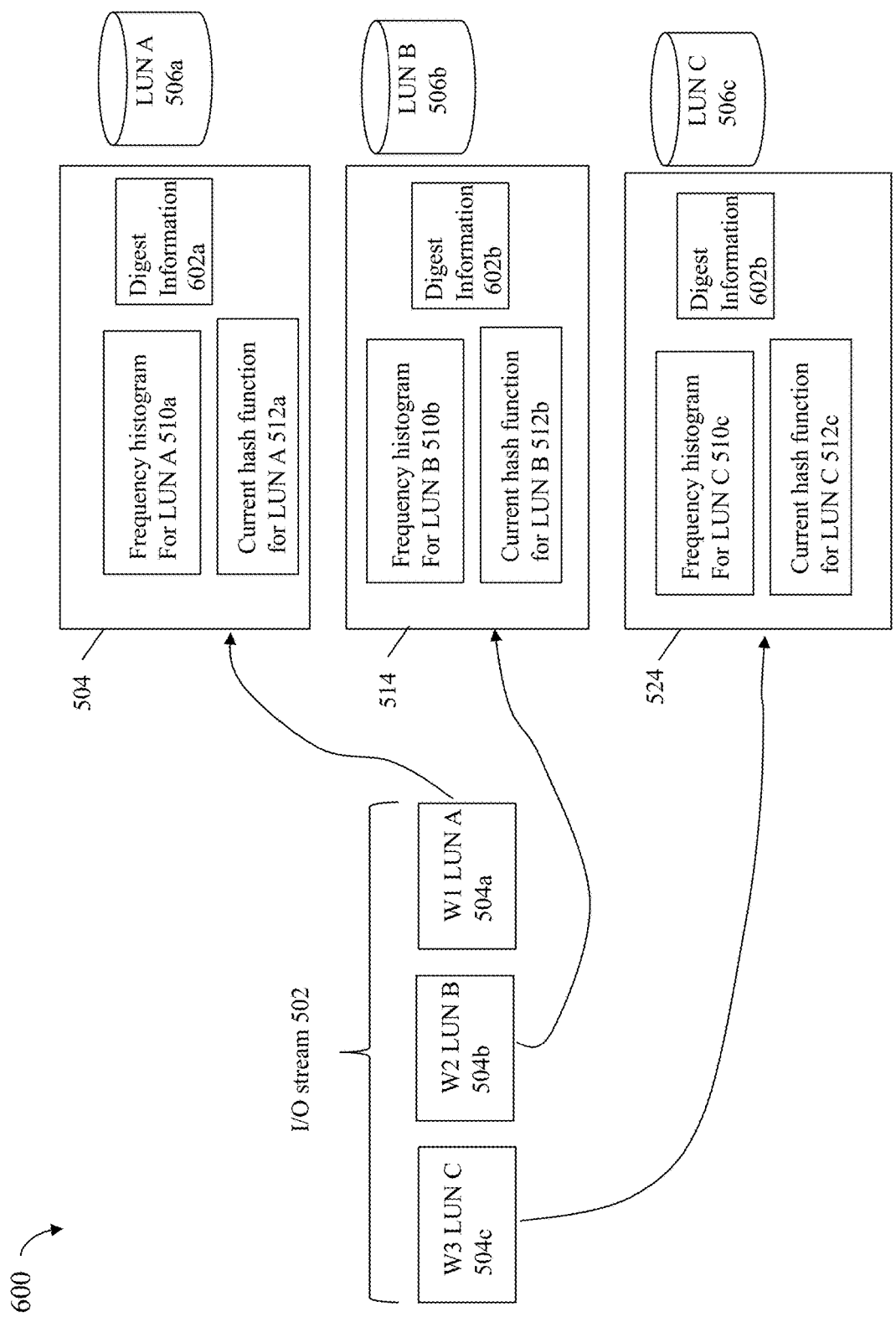

Referring to the FIG. 6, shown is another example illustrating an embodiment using the techniques herein. The example 600 includes components similarly numbered and described herein in connection with the FIG. 5. Additionally, the 3 sets of state information, 504, 514 and 524, also include, respectively, digest information 602a-c. The digest information 602a may specify whether the digest used in connection with data deduplication processing for data of the LUN A 506a uses a truncated version of the hash value generated by the hash function 512a. The digest information 602a may also indicate the current size, such as in number of bits or bytes, of the digest used with data deduplication processing for data of the LUN A 506a. The digest information 602a may also indicate the size, such as in number of bits or bytes, of the hash values as generated directly as an output of the hash function 512a used with data deduplication processing for data of the LUN A 506a. For example, the hash function 512a may be a cryptographic hash function using the SHA-256 hash algorithm which generates 32 byte hash values. At the current point in time when the frequency distribution of 510a is determined as not sufficiently uniform, the digest information 602a may indicate that the digests used in connection with data deduplication for data of the LUN A 506a are 24 bytes and that the SHA-256 hash function identified by 512a generates 32 byte hash values. As such, responsive to determining that the frequency distribution of 510a is not sufficiently uniform, processing in accordance with the techniques herein may further increase the digest size from 24 bytes, for example, to 32 bytes and may continue to use the same SHA-256 cryptographic hash function. In this case the digest information 504 may be accordingly updated to indicate the new current digest size of 32 bytes.

In a manner similar to the digest information 602a, the digest information 602b may specify whether the digest used in connection with data deduplication processing for data of the LUN B 506b uses a truncated version of the hash value generated by the hash function, indicate the size of the digest used with data deduplication processing for data of the LUN B 506b, and indicate the size of the hash values as generated directly as an output of the hash function 512b used with data deduplication processing for data of the LUN B 506b.

Further in a manner similar to the digest information 602a, the digest information 602c may specify whether the digest used in connection with data deduplication processing for data of the LUN C 506c uses a truncated version of the hash value generated by the hash function, indicate the size of the digest used with data deduplication processing for data of the LUN C 506c, and indicate the size of the hash values as generated directly as an output of the hash function 512c used with data deduplication processing for data of the LUN C 506c.

In at least one embodiment as described in connection with the FIG. 6, data deduplication processing may continue to maintain and update the frequency histogram for a particular data set as long as all available options or selections that can be performed to further increase the uniformity of the distribution of the frequency histogram have not been exhausted. Additionally, as described herein, each of the cells or entries of the frequency histogram, such as illustrated in the FIG. 4, may be incrementally updated as each new data chunk is written or processed in connection with data deduplication. In this manner, the frequencies or counter values of the frequency histogram may denote cumulative frequency or counter values. If the size of the digest increases, then the corresponding dimension and thus size of the frequency histogram will also accordingly change. For example, with reference to the FIG. 4, increasing the number of bytes of the digest size from 16 bytes to 24 bytes means that the Z dimension is accordingly increased.

Figure 7:
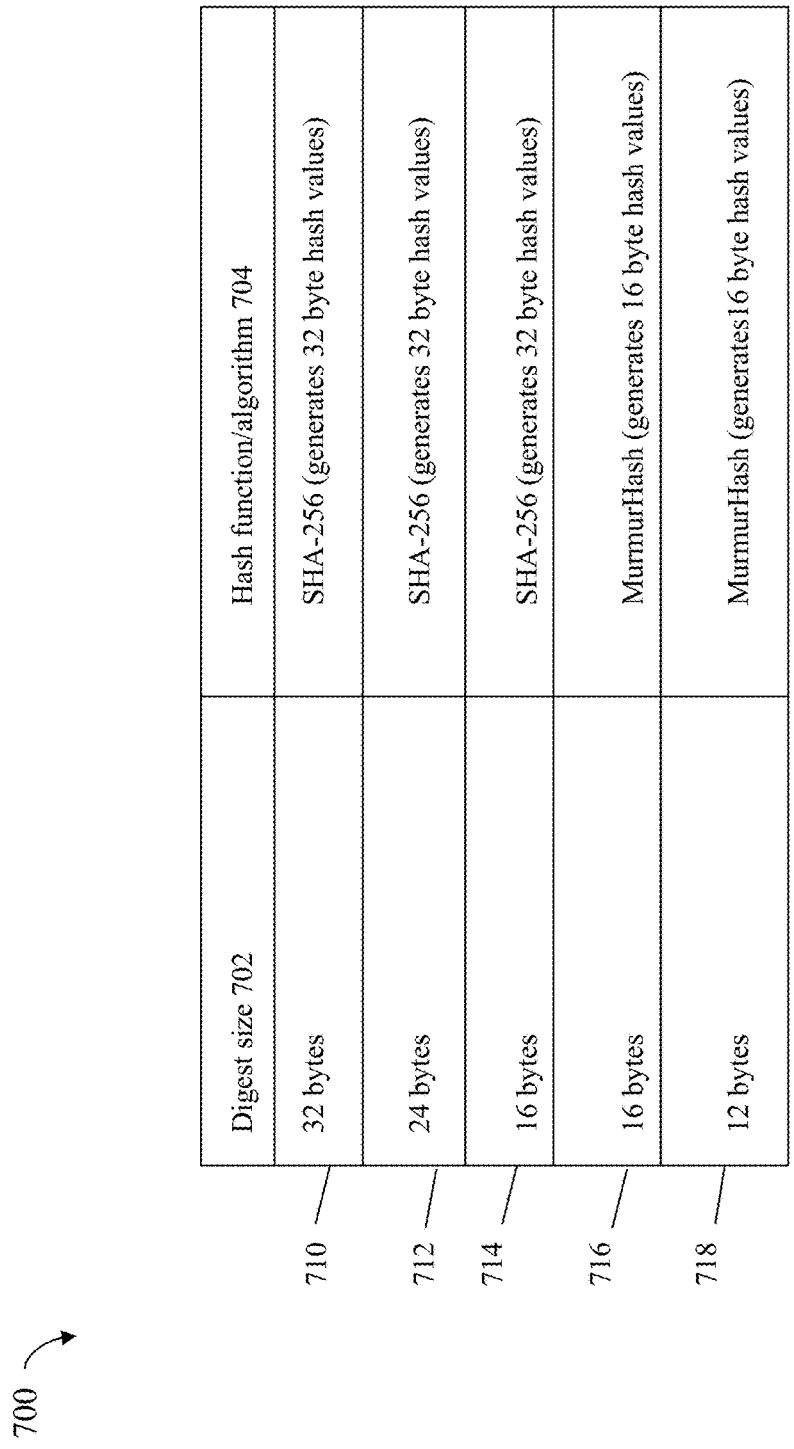
FIG. 7 is an example of a table of different digest sizes and hash functions or algorithms that may be used in an embodiment in accordance with the techniques herein.

Referring to the FIG. 7, shown is an example of the different hash functions or algorithms and associated digest sizes that may be used in an embodiment in accordance with techniques herein. The example 700 is a table including a first column of digest sizes 702 as used with data deduplication processing, and a second column of hash functions or algorithms. The table 700 includes a row for each allowable digest size 702 for data deduplication processing and denotes (in column 704 of that same row) the hash function or algorithm used for that allowable digest size. It should be noted that each of the different hash functions or algorithms in column 704 is a hash function or algorithm known in the art. For example row 710 indicates that the SHA-256 cryptographic hash function may be used for a digest size of 32 bytes. The SHA-256 hash algorithm generates a 32 byte output that may be used as the digest for a data chunk.

Row 712 indicates that the SHA-256 cryptographic hash function may also be used for a digest size of 24 bytes. In this case, since the SHA-256 hash algorithm generates a 32 byte output, 24 bytes of the 32 byte output may be used as the digest for the chunk when a 24 byte digest is desired.

Row 714 indicates that the SHA-256 hash algorithm may be used for a digest size of 16 bytes. In this case, since the SHA-256 hash algorithm generates a 32 byte output, 16 bytes of the 32 byte output may be used as the digest for the chunk when a 16 byte digest is desired.

Row 716 indicates that the MurmurHash non-cryptographic hash function may be used for a digest size of 16 bytes. MurmurHash is a non-cryptographic hash function known in the art that is suitable for general hash-based lookup. Unlike cryptographic hash functions, non-cryptographic hash functions such as MurmurHash are not specifically designed to be difficult to reverse, making it generally unsuitable for cryptographic purposes but useful and suitable for other purposes such as data deduplication as described herein. MurmurHash has several variants which are in the public domain. For purposes of illustration in this example, assume that the MurmurHash hash function is Murmur3 and generates a 16 byte hash value. Row 718 indicates that the MurmurHash hash function may also be used for a digest size of 12 bytes. In this case, since the MurmurHash hash algorithm generates a 16 byte output, 12 bytes of the 16 byte output may be used as the digest or hash value for the chunk.

Thus, the column 702 of the table 700 includes a single row for each of the allowable digest sizes of 12 bytes, 24 bytes and 32 bytes, and includes two rows indicating an allowable digest size of 16 bytes. For each allowable digest size 702 in a particular row, a corresponding hash function or algorithm is specified in column 704 of that same row. The table 700 specifies 5 rows 710, 712, 714, 716 and 718, each indicating a different allowable option or selection that can be made in efforts to increase the uniformity of a frequency distribution for a particular data set. In the example 700, the bottom or last row 718 may indicate the starting state or initial hash function and digest size used for each data set. The first time that the frequency distribution for the data set is determined to not be sufficiently uniform, an embodiment may select to implement the option or selection denoted by row 716 where the digest size is increased from 12 bytes to 16 bytes but the same hash function, MurmurHash, is used. The second time (subsequent to the first time) that the frequency distribution for the data set is determined to not be sufficiently uniform, the option or selection denoted by row 714 may be implemented where the digest size remains at 16 bytes but a different stronger hash function, SHA-256, may be used. The third time (subsequent to the second time) that the frequency distribution for the data set is determined to not be sufficiently uniform, the option or selection denoted by row 712 may be implemented where the digest size is increased from 16 bytes to 24 bytes and the same hash function, SHA-256 may be used. The fourth time (subsequent to the third time) that the frequency distribution for the data set is determined to not be sufficiently uniform, the option or selection denoted by row 710 may be implemented where the digest size is increased from 24 bytes to 32 bytes and the same hash function, SHA-256 may be used. Subsequent to this last fourth point in time, all available allowable options that may be implemented to further increase the uniformity of the frequency distribution have been exhausted. As such, an embodiment may no longer perform the processing to maintain and update the frequency distribution and evaluate the uniformity of the frequency distribution for the data set.

The particular hash functions or algorithms and digest sizes such as included in connection with the table of the FIG. 7 are merely examples of different options that may be used in an embodiment in accordance with the techniques herein. Generally, an embodiment may select from any suitable number of different hash functions or algorithms of different algorithmic strengths and is not limited to just SHA-256 and Murmur3. An embodiment may also use additional hash functions of different algorithmic strengths. For example, an embodiment may use (from weakest to strongest) CRC (cyclic redundancy check), Murmur3, SHA-1, and SHA-256. An embodiment may choose to increase the uniformity of the frequency distribution, such as described in connection with the FIG. 4, by using a different hash function that is algorithmically stronger than a current hash function without increasing the digest size used. As a first variation, an embodiment may choose to increase the uniformity of the frequency distribution, such as described in connection with the FIG. 4, by using the same hash function but using a larger digest size by modulating the number of bytes/bits selected for use from the hash value generated by the hash function (e.g., the digest may not include all bytes/bits of the hash value generated by the hash function and the number of bytes/bits used may be increased). As yet another variation, an embodiment may choose to increase the uniformity of the frequency distribution, such as described in connection with the FIG. 4, by both using a different hash function and also increasing the digest size. The different hash function may be algorithmically stronger than a current hash function.

It should be noted that although the FIG. 7 illustrates use of hash functions that may be characterized as both cryptographic and non-cryptographic, at least one embodiment may utilize only cryptographic hash functions and may therefore switch between only cryptographic hash functions. As a variation, another embodiment may utilize only non-cryptographic hash functions and may therefore switch between only non-cryptographic hash functions. Even though only non-cryptographic hash functions may be used in the latter embodiment, consistent with discussion elsewhere herein, the same non-cryptographic hash function may result in possibly very different measured levels of uniformities for the frequency distributions of generated digests for different data sets. Thus, depending on the data set, switching between two different non-cryptographic hash functions for the same data set may result in greater uniformity of the frequency distribution of generated digests for the data set.

As noted above, an embodiment may specify a default or initial setting for the digest size and the particular hash function or algorithm used for all data sets. For example, the option indicated by row 718 may be implemented as the initial default digest size and hash function used for all data sets. As a variation, an embodiment may use another technique to determine the initial customized settings for the digest size and hash function used for a particular data set. For example, assume the data set is LUN A 506a as in the FIGS. 5 and 6. In at least one embodiment, processing to determine initial customized settings for the LUN A 506a may include offline processing on a sample or portion of data currently stored on LUN A 506a using the techniques herein to determine a frequency distribution such as illustrated and described in connection with the FIG. 4 for the sample data. For example, for the sample data, a first frequency distribution may be determined using first settings including a digest size and hash function (e.g., such as denoted by row 718 of the FIG. 7), a second frequency distribution may be determined using second settings including a digest size and hash function (e.g., such as denoted by row 716 of the FIG. 7), and a third frequency distribution may be determined using third settings including a digest size and hash function (e.g., such as denoted by row 714 of the FIG. 7). The foregoing 3 frequency distributions may be evaluated to determine which of the distributions is sufficiently uniform. The initial settings used for LUN A may be determined as those settings associated with one of the frequency distributions determined as being sufficiently uniform in accordance with one or more criteria as described herein. For example, if it is determined that only the third settings have an associated frequency distribution that is sufficiently uniform, then the digest size and hash function of the third settings may be used as initial customized settings for data deduplication processing for data of LUN A. As a variation, if it is determined that both the second and third settings have associated frequency distributions that are sufficiently uniform in accordance with specified criteria, then processing may be performed to further compare the statistical variances (e.g., EQUATION 3) for the second frequency distribution obtained using the second settings and for the third frequency distribution obtained using the third settings. For example, the particular frequency distribution having the smallest variance may be selected and the digest size and hash function used in generated the particular frequency distribution may be used as the initial customized settings for data deduplication processing for data of LUN A.

In at least one embodiment in accordance with the techniques herein, processing may also be performed to evaluate, in accordance with specified criteria, whether the distribution of frequencies for generated digests has consistently for multiple successive time periods of assessment exceeded an expected threshold level of uniformity. In such a case, a weaker or less computationally intensive hash function may be utilized rather than the current hash function where use of the weaker or less computationally intensive hash function may still result in the distribution of frequencies for generated digests having at least a sufficient level of uniformity. In such a case, a smaller digest size may be utilized rather than the current digest size where use of the smaller digest size may still result in the distribution of frequencies for generated digests having at least a sufficient level of uniformity. For example, an embodiment may use criteria that includes a first variance threshold and a second variance threshold that is less than the first variance threshold. The first variance threshold may specify a maximum allowable statistical variance that the distribution (e.g., of the frequency histogram as in the FIG. 4) may have in order to be considered sufficiently uniform. If the distribution's variance exceeds the first variance threshold, the distribution is considered not sufficiently uniform and a responsive action may be taken as described herein to increase subsequent measures of uniformity of the distribution determined using subsequently generated digests. If the distribution's variance does not exceed the first variance threshold, the distribution is considered sufficiently uniform and a further determination may be made as to whether the distribution's variance has been less than the second variance threshold for a specified amount of time (e.g., such as for a predetermined number of consecutive assessment or evaluation time periods). If the distribution's variance has been less than the second variance threshold for a specified amount of time (e.g., such as for the predetermined number of consecutive assessment or evaluation time periods), processing may be performed, for example, to use a less computationally intensive or weaker hash function and/or use a smaller digest size. In at least one embodiment, such changes may be performed to modify the settings used for data deduplication to utilize less system resources.

In this manner, an embodiment in accordance with techniques herein may adaptively modify the data deduplication settings customized for a particular data set by comparing measurements or metrics denoting the measured uniformity of the distribution to one or more threshold levels of uniformity. As the measured uniformity of the distribution obtained for a particular data set when generating digests using a particular hash function may change over time, the modifications may include performing any of: transitioning to a stronger or more computationally intensive hash function, transitioning to a weaker or less computationally intensive hash function, increasing the digest size and decreasing the digest size.

Figure 8A:
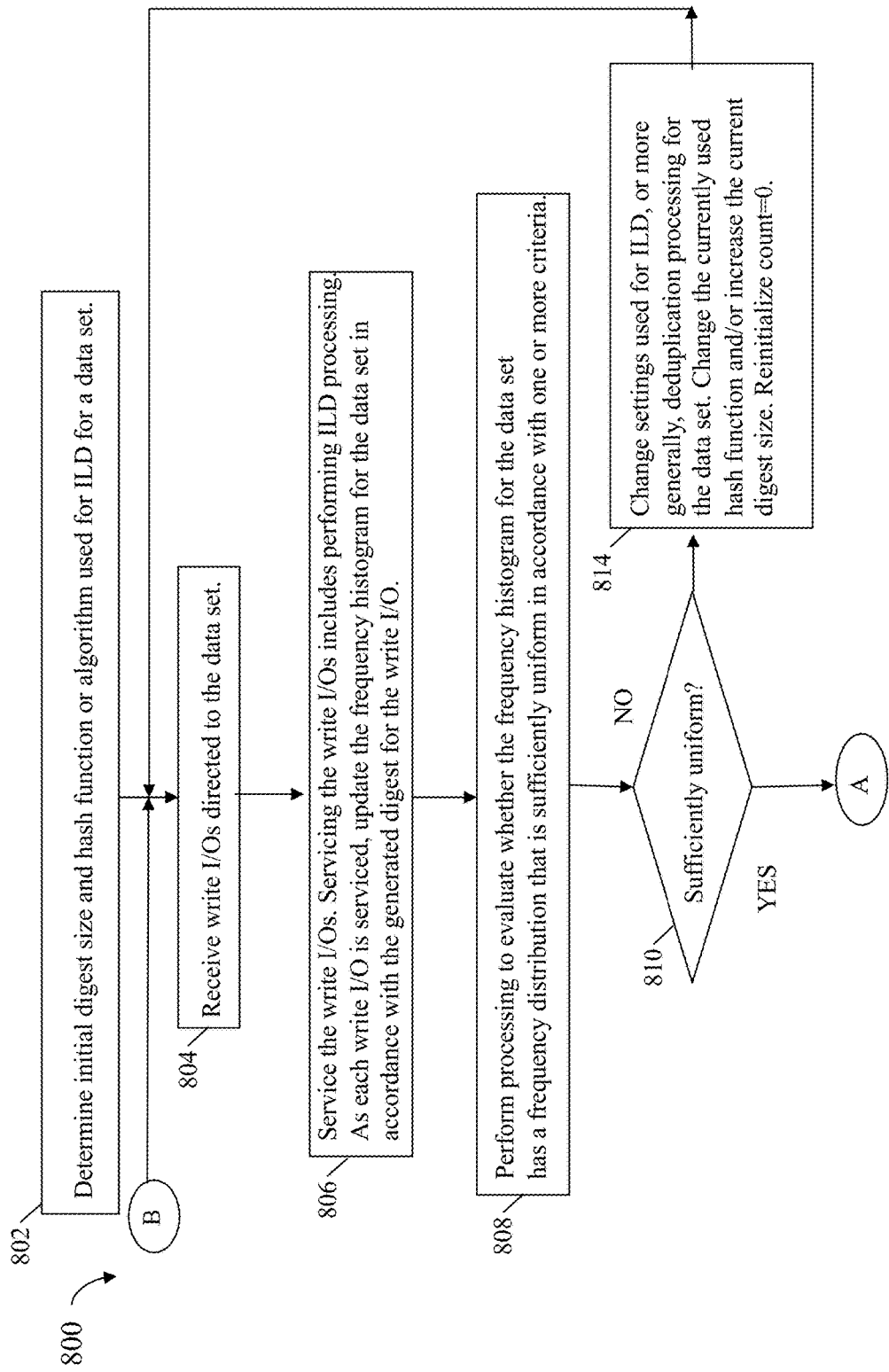
FIGS. 8A, 8B, 9A and 9B are flowcharts of processing steps that may be performed in embodiments in accordance with the techniques herein.
Figure 8B:
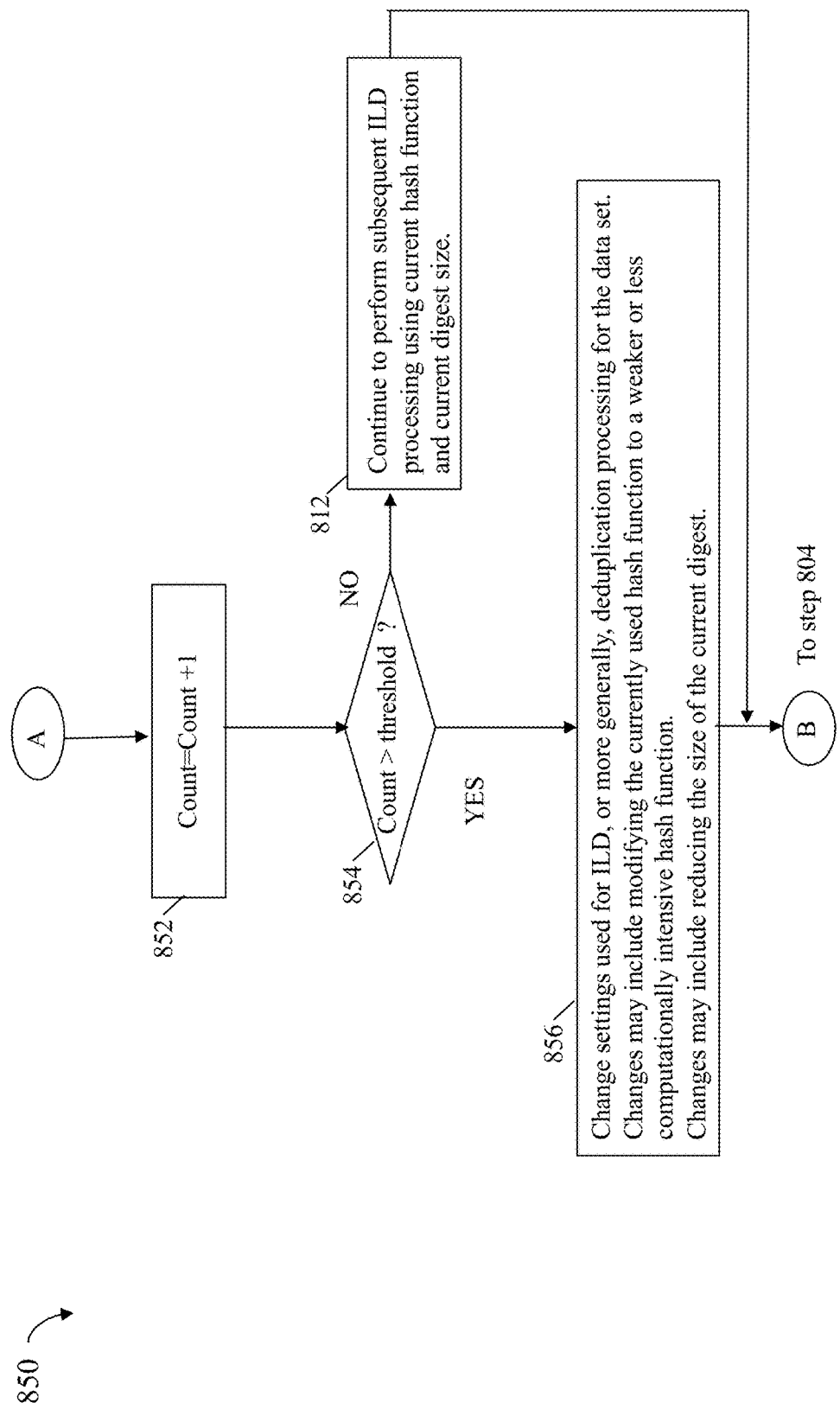

Referring to the FIGS. 8A and 8B, shown are flowcharts of processing steps that may be performed in an embodiment in accordance with the techniques herein for a single data set. The flowcharts 800 and 850 summarize processing described above that may be performed for the data set. At the step 802, processing may be performed to determine the initial digest size and initial hash function or algorithm used for ILD processing, or more generally data deduplication processing, for the data set. The step 802 may also include initializing a variable count to 0. Count is used in processing of the FIGS. 8A and 8B to count the number of successive time periods of assessment or evaluation that the measured level of uniformity for the frequency distribution (e.g., as in the FIG. 4) for the data set exceeds a specified threshold level of uniformity. Consistent with discussion elsewhere herein, when the value of count exceeds a threshold number, processing may be performed to change the settings used for data deduplication for the data set. The changes to the settings used for data deduplication processing may include using a weaker, or more generally, less computationally intensive hash function. The changes to the settings used for data deduplication processing may include using a smaller digest size.

From the step 802, processing proceeds to the step 804. At the step 804, write I/Os directed the data set are received. From the step 804, processing proceeds to the step 806. At the step 806, processing is performed to service the write I/Os received. The step 806 processing to service the write I/Os directed to the data set includes performing ILD processing. As each write I/O of the data set is serviced, the frequency histogram for the data set is updated in accordance with the generated digest for the write I/O. From the step 806, control proceeds to the step 808.

At the step 808, processing is performed to evaluate whether the frequency histogram for the data set has a frequency distribution that is sufficiently uniform in accordance with one or more criteria. The step 808 may include, for example, performing statistical calculations such as determining a variance for the frequency distribution. In at least one embodiment, the evaluation at step 808 may be performed periodically at various points in time. From the step 808, control proceeds to the step 810.

At the step 810, a determination is made as to whether the frequency histogram is sufficiently uniform in accordance with the one or more criteria. The step 810 may include, for example, comparing the calculated variance for the frequency distribution to a threshold maximum variance where the criteria may specify that for the frequency distribution to be sufficiently uniform, the calculated variance for the frequency distribution should be less than the threshold maximum variance. If the step 810 evaluates to no indicating that the frequency distribution for the data set is not sufficiently uniform, then processing continues with the step 814. At the step 814, the settings used for ILD, or more generally deduplication processing for the data set, may be changed. The step 814 may include changing the currently used hash function to a stronger hash function (e.g., expected to generate a distribution of digests that is more uniform in comparison to the current distribution and current hash function) and/or increasing the size of the current digest hash. The step 814 includes reinitializing the count to 0. From the step 814, control proceeds to step 804.

If the step 810 evaluates to yes indicating that the frequency distribution for the data set is sufficiently uniform, then processing continues with the step 852. At the step 852, count is incremented by 1. From the step 852, control proceeds to the step 854. At the step 854, a determination is made as to whether the current value of count exceeds a specified threshold count of the criteria. If the step 854 evaluates to no, control proceeds to step the 812. At the step 812, subsequent ILD processing for subsequent write I/Os may be performed using the current hash function and the current digest size. From the step 812, control proceeds to the step 804.

If the step 854 evaluates to yes, control proceeds to the step 856. At the step 856, processing is performed to change the settings used for ILD, or more generally, for data deduplication processing of the data set. The changes may include modifying the currently used hash function to a weaker or less computationally intensive hash function. The changes may include reducing the size of the current digest. From the step 856, control proceeds to the step 804.

Figure 9A:
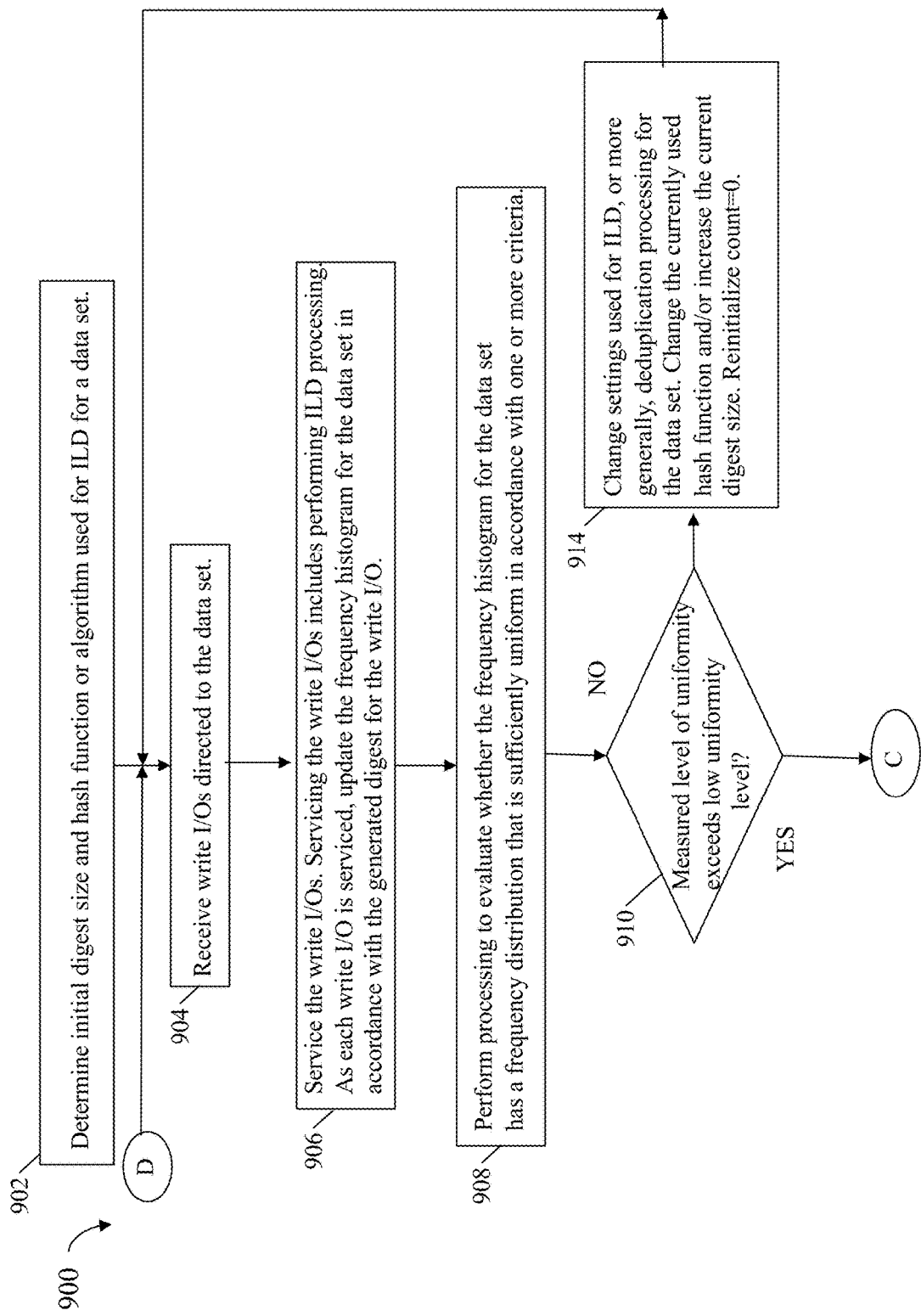
Figure 9B:
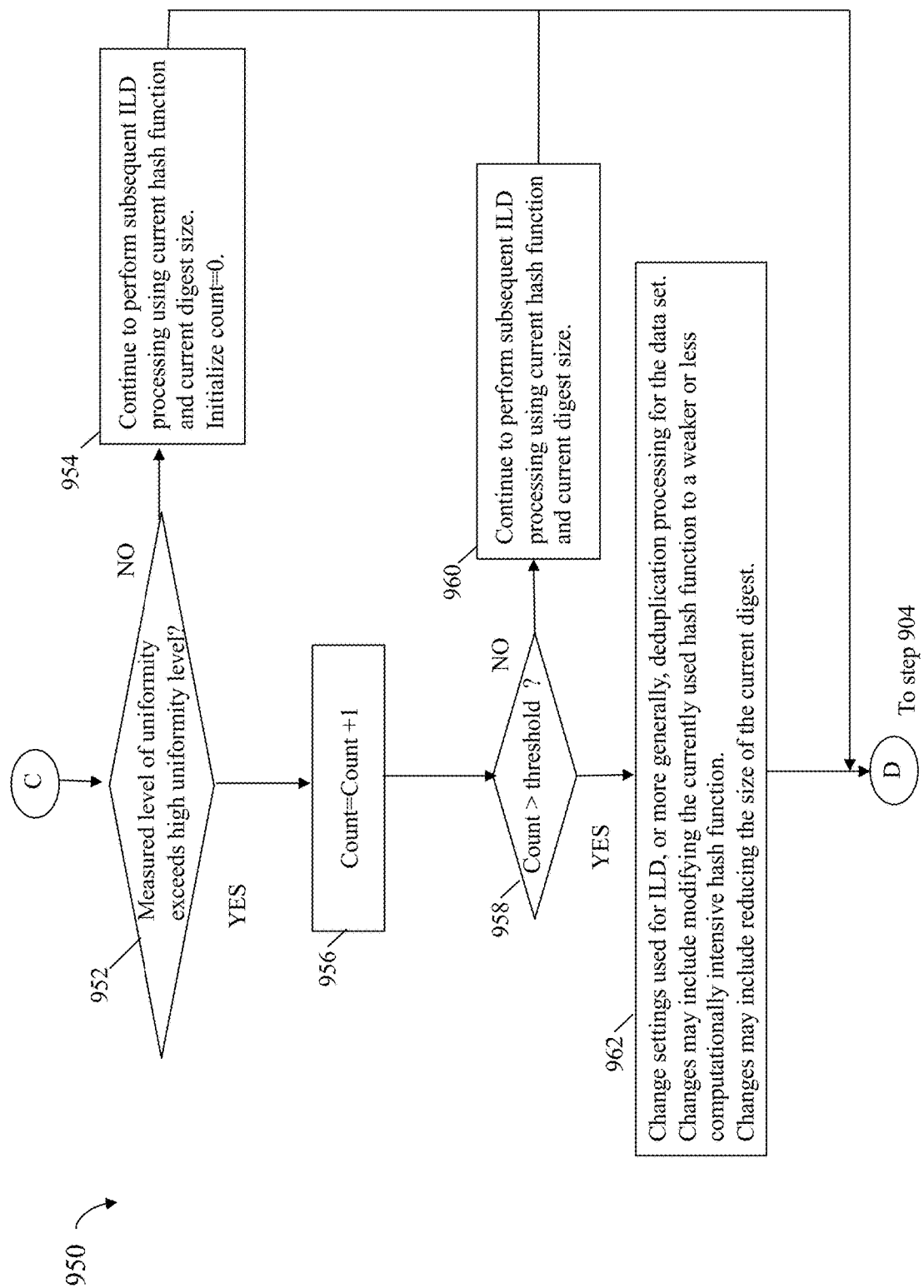

Referring to the FIGS. 9A and 9B, shown are flowcharts of processing steps that may be performed in an embodiment in accordance with the techniques herein for a single data set. The flowcharts 900 and 950 summarize processing described above that may be performed for the data set. The FIGS. 8A and 8B use a single threshold level of uniformity included in the specified criteria. In contrast, the FIGS. 9A and 9B describe a variation in which two threshold levels of uniformity, a low uniformity level and a high uniformity level of the specified criteria, are used. Generally, the low uniformity level may be characterized as the minimum level of uniformity to be maintained. If the observed or measured level of uniformity with respect to the frequency distribution of digests does not achieve the low uniformity level, then processing may be performed to change the settings used for data deduplication processing to increase the expected level of uniformity for subsequently generated frequency distributions of digests for the data set. If the observed or measured level of uniformity with respect to the frequency distribution of digests exceeds the low uniformity level and additionally exceeds the high uniformity level consistently for a specified amount of time, then processing may be performed to change the settings used for data deduplication processing to relax or possibly decrease the expected level of uniformity for subsequently generated frequency distributions of digests for the data set.

The steps 902, 904, 906, 908 and 914 of the FIG. 9A are respectively similar to the steps 802, 804, 806, 808 and 814 of the FIG. 8A.

At the step 902, processing may be performed to determine the initial digest size and initial hash function or algorithm used for ILD processing, or more generally data deduplication processing, for the data set. The step 802 may also include initializing a variable count to 0.

From the step 902, processing proceeds to the step 904. At the step 904, write I/Os directed the data set are received. From the step 904, processing proceeds to the step 906. At the step 906, processing is performed to service the write I/Os received. The step 906 processing to service the write I/Os directed to the data set includes performing ILD processing. As each write I/O of the data set is serviced, the frequency histogram for the data set is updated in accordance with the generated digest for the write I/O. From the step 906, control proceeds to the step 908.

At the step 908, processing is performed to evaluate whether the frequency histogram for the data set has a frequency distribution that is sufficiently uniform in accordance with one or more criteria. The step 908 may include, for example, performing statistical calculations such as determining a variance for the frequency distribution. In at least one embodiment, the evaluation at the step 908 may be performed periodically at various points in time. From the step 908, control proceeds to the step 910.

At the step 910, a determination is made as to whether the frequency histogram has a measured level of uniformity for the distribution, such as indicated by the variance, that exceeds the minimum or low uniformity level of the criteria. The step 910 may include, for example, comparing the calculated variance for the frequency distribution to a first threshold variance where the criteria may specify that the frequency distribution should have a calculated variance less than the first variance threshold. If the step 910 evaluates to no indicating that the frequency distribution for the data set is not less than the first variance threshold (e.g., does not meet the minimum specified uniformity level), then processing continues with the step 914. At the step 914, the settings used for ILD, or more generally deduplication processing for the data set, may be changed. The step 914 may include changing the currently used hash function to a stronger hash function (e.g., expected to generate a more uniform distribution of digests in comparison to the current distribution of digests generated using the current hash function) and/or increasing the size of the current digest hash. The step 914 includes reinitializing the count to 0. From the step 914, control proceeds to step 904.

If the step 910 evaluates to yes indicating that the frequency distribution for the data set is less than the first variance threshold (e.g., does meet the minimum specified uniformity level), then processing continues with the step 952. At the step 952, a determination is made as to whether the measured level of uniformity for the distribution, exceeds the high uniformity level. The step 952 may include, for example, comparing the calculated variance for the frequency distribution to a second threshold variance to determine whether the calculated variance is also less than the second variance threshold. The second variance threshold is less than the first variance threshold. The lower the variance, the more uniform the distribution. Thus, the lower the variance threshold, the higher the specified level of uniformity. If the step 952 evaluates to no, where the measured level of uniformity does not exceed the high uniformity level (e.g., calculated variance is not less than the second variance threshold), then control proceeds to the step 954. At the step 954, subsequent ILD processing for subsequent write I/Os may be performed using the current hash function and the current digest size. The step 954 may include reinitializing count to 0. From the step 954, control proceeds to the step 904.

If the step 952 evaluates to yes, where the measured level of uniformity does exceed the high uniformity level (e.g., calculated variance is less than the second variance threshold), then control proceeds to the step 956. At the step 956, the variable count is incremented by 1. From the step 956, control proceeds to the step 958. At the step 958, a determination is made as to whether the current value of count exceeds a specified threshold count. If the step 958 evaluates to no, control proceeds to step the 960. At the step 960, subsequent ILD processing for subsequent write I/Os may be performed using the current hash function and the current digest size. From the step 960, control proceeds to the step 904.

If the step 958 evaluates to yes, control proceeds to the step 962. At the step 962, processing is performed to change the settings used for ILD, or more generally, data deduplication processing for the data set. The changes may include modifying the current hash function to be a weaker or less computationally intensive hash function, relative to the current hash function. The changes may include reducing the size of the current digest. In at least one embodiment, all the hash functions that may potentially be selected for use with a particular data set may be ranked in terms of relative computational intensity. The highest ranked hash function may utilize the most CPU time of all hash functions to calculate a digest. The lowest ranked hash function may utilize the least CPU time of all hash functions to calculate a digest. In this manner, the ranking denotes a relative ranking of the hash functions with respect to the expected amount of time it takes each ranked hash function to calculate a digest. Generally, stronger hash functions are more computationally intensive and thus higher ranked in the ranking. In a similar manner, weaker hash function are generally less computationally intensive and thus ranked lower in the ranking. The step 962 may include selecting a new or different hash function for use that is ranked in the ranking as less computationally intensive than the current hash function used for generating digests for the data set. From the step 962, processing proceeds to step 904.

In at least one embodiment, possible options performed in connection with the steps 814 (e.g., of the FIG. 8A), 856 (e.g., of the FIG. 8B), 914 (e.g., of the FIG. 9A) and 962 (e.g., of the FIG. 9B) may only include modifying the hash function when performing ILD processing. In such an embodiment, modulating the size of the digest hash may not be used as a means to control or vary the uniformity of the frequency distribution. In at least one such embodiment, a predetermined fixed size may be used as the size of the digests. If the hash function generates hash values that are smaller in size than the fixed size, insignificant bit positions in generated digests may be zeroed. If the hash function generates hash values that are larger in size than the fixed size, a specified number of bits/bytes of the generated hash value equal to the fixed size may be used for the digest while discarding any remaining bits/bytes of the generated hash value.

In at least one embodiment, the techniques herein may be used with data deduplication processing performed inline as part of the I/O or data path, as described above in connection with ILC and ILD processing. However, it should be noted that the techniques herein are more generally applicable for use in deduplication performed which is not inline or not part of the I/O or data path, such when processing a data set offline or in the background.

The techniques herein may be performed by any suitable hardware and/or software. For example, the techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
receiving a plurality of data chunks for a data set;
performing data deduplication processing for the plurality of data chunks, wherein said data deduplication processing includes:
determining, using a current hash algorithm, a plurality of digests for the plurality of data chunks of the data set; and
updating a frequency histogram for the data set in accordance the plurality of digests, wherein the frequency histogram is a digest byte value histogram that tracks frequencies or counter values of different observed byte values for each individual byte position in digests computed for chunks of the data set, wherein each of the plurality of digests is a current digest size that is a specified number of bytes, wherein said updating includes performing update processing that updates the frequency histogram for each of the plurality of digests and, for each byte located at each byte position of said each digest, performs processing comprising:
determining a byte value for said each byte located at said each byte position of said each digest; and
incrementing a cell of the frequency histogram denoting a frequency or counter value corresponding to said byte value for said each byte position;
determining, in accordance with one or more criteria, whether a frequency distribution of the frequencies or counter values corresponding to the observed byte values for the individual byte positions of the frequency histogram is sufficiently uniform; and
responsive to determining that the frequency distribution of the frequencies or counter values corresponding to the observed byte values for the individual byte positions of the frequency histogram is not sufficiently uniform, performing processing to update data deduplication settings for the data set.

2. The method of claim 1, wherein the data deduplication settings include the current hash algorithm and the current digest size.

3. The method of claim 2, wherein the processing to update the data deduplication settings for the data set includes modifying any of the current hash algorithm and the current digest size.

4. The method of claim 3, wherein modifying the current hash algorithm includes selecting a new hash algorithm to be used in connection with generating digests for data deduplication processing performed for subsequent data chunks of the data set.

5. The method of claim 4, wherein the new hash algorithm is a stronger hash algorithm than the current hash algorithm and the new hash algorithm is expected to generate a second distribution of frequencies with respect to byte values for bytes of generated digests whereby the second distribution of frequencies is expected to be more uniform than the frequency distribution of the frequency histogram generated using the current hash algorithm.

6. The method of claim 5, wherein the current hash algorithm is a non-cryptographic hash algorithm that is replaced with the new hash algorithm that is a cryptographic hash algorithm.

7. The method of claim 3, wherein modifying the current digest size includes selecting a new digest size to be used in connection with generating digests for data deduplication processing performed for subsequent data chunks of the data set.

8. The method of claim 1, wherein the frequency histogram has a plurality of dimensions including a first dimension denoting the specified number of bytes.

9. The method of claim 8, wherein the plurality of dimensions of the frequency histogram further includes a second dimension denoting a number of allowable byte values for each byte of a digest having the current digest size.

10. The method of claim 9, wherein the plurality of dimensions of the frequency histogram further includes a third dimension of counter values or frequencies for each different allowable byte value of each byte for a digest having the current digest size.

11. The method of claim 1, wherein the one or more criteria indicates that, for the frequency distribution to be sufficiently uniform, at least one statistical metric for the frequency distribution is less than a specified maximum threshold.

12. The method of claim 11, wherein the at least one statistical metric includes any of variance and standard deviation.

13. The method of claim 1, wherein the data set includes any of a logical device, a database, one or more selected portions of a database, data used by a particular application stored on one or more logical devices, selected portions of one or more logical devices, one or more files, one or more directories, one or more file systems, particular portions of one or more directories, and particular portions of one or more file systems.

14. The method of claim 1, wherein the method is performed as part of inline processing of the plurality of data chunks in connection with an I/O path or data path when servicing I/Os accessing the plurality of data chunks.

15. The method of claim 1, wherein the method is performed offline and not as part of inline processing of the plurality of data chunks in connection with an I/O path or data path when servicing I/Os accessing the plurality of data chunks.

16. The method of claim 1, further comprising:
determining, in accordance with the one or more criteria, whether the frequency distribution of the frequency histogram has maintained a specified level of uniformity for a specified time period; and
responsive to determining the frequency distribution of the frequency histogram has maintained a specified level of uniformity for a specified time period, performing first processing to update the data deduplication settings for the data set, wherein said first processing includes performing any of:
updating the current hash algorithm to a new hash algorithm that is computationally less intensive that the current hash algorithm whereby the new hash algorithm is expected to take less processor time than the current hash algorithm to generate a same digest; and
reducing a current digest size of digests generated using the current hash algorithm.

17. The method of claim 1, wherein said determining whether the frequency distribution of the frequencies or counter values corresponding to the observed byte values for the individual byte positions of the frequency histogram is sufficiently uniform includes determining whether the frequencies or counter values of the frequency histogram approximate an even or uniform distribution within a specified tolerance, threshold or limit.

18. The method of claim 17, wherein said determining whether the frequencies or counter values of the frequency histogram approximate an even or uniform distribution within a specified tolerance, threshold or limit includes determining whether all the frequencies or counter values of the frequency histogram vary by more than a specified number of one or more standard deviations from a mean of all the frequencies or counter values of the frequency histogram.

19. A system comprising:
    at least one processor; and
    a memory comprising code stored thereon that, when executed, perform a method of processing data comprising:
        receiving a plurality of data chunks for a data set;
        performing data deduplication processing for the plurality of data chunks, wherein said data deduplication processing includes:
            determining, using a current hash algorithm, a plurality of digests for the plurality of data chunks of the data set; and
            updating a frequency histogram for the data set in accordance the plurality of digests, wherein the frequency histogram is a digest byte value histogram that tracks frequencies or counter values of different observed byte values for each individual byte position in digests computed for chunks of the data set, wherein each of the plurality of digests is a current digest size that is a specified number of bytes, wherein said updating includes performing update processing that updates the frequency histogram for each of the plurality of digests and, for each byte located at each byte position of said each digest, performs processing comprising:
                determining a byte value for said each byte located at said each byte position of said each digest; and
                incrementing a cell of the frequency histogram denoting a frequency or counter value corresponding to said byte value for said each byte position;
        determining, in accordance with one or more criteria, whether a frequency distribution of the frequencies or counter values corresponding to the observed byte values for the individual byte positions of the frequency histogram is sufficiently uniform; and
        responsive to determining that the frequency distribution of the frequencies or counter values corresponding to the observed byte values for the individual byte positions of the frequency histogram is not sufficiently uniform, performing processing to update data deduplication settings for the data set.

20. A non-transitory computer readable medium comprising code stored thereon that, when executed, performs a method of processing data comprising:
    receiving a plurality of data chunks for a data set;
    performing data deduplication processing for the plurality of data chunks, wherein said data deduplication processing includes:
        determining, using a current hash algorithm, a plurality of digests for the plurality of data chunks of the data set; and
        updating a frequency histogram for the data set in accordance the plurality of digests, wherein the frequency histogram is a digest byte value histogram that tracks frequencies or counter values of different observed byte values for each individual byte position in digests computed for chunks of the data set, wherein each of the plurality of digests is a current digest size that is a specified number of bytes, wherein said updating includes performing update processing that updates the frequency histogram for each of the plurality of digests and, for each byte located at each byte position of said each digest, performs processing comprising:
            determining a byte value for said each byte located at said each byte position of said each digest; and
            incrementing a cell of the frequency histogram denoting a frequency or counter value corresponding to said byte value for said each byte position;
    determining, in accordance with one or more criteria, whether a frequency distribution of the frequencies or counter values corresponding to the observed byte values for the individual byte positions of the frequency histogram is sufficiently uniform; and
    responsive to determining that the frequency distribution of the frequencies or counter values corresponding to the observed byte values for the individual byte positions of the frequency histogram is not sufficiently uniform, performing processing to update data deduplication settings for the data set.

21. The non-transitory computer readable medium of claim 20, wherein the data deduplication settings includes the current hash algorithm and the current digest size.

22. The non-transitory computer readable medium of claim 21, wherein the processing to update the data deduplication settings for the data set includes modifying any of the current hash algorithm and the current digest size.

* * * * *